(12) United States Patent
Slivka et al.

(10) Patent No.: US 10,080,273 B1
(45) Date of Patent: Sep. 18, 2018

(54) AUTOMATIC LOAD DETECTION IN A DIMMER

(71) Applicant: Crestron Electronics, Inc., Rockleigh, NJ (US)

(72) Inventors: Benjamin Slivka, Hillsdale, NJ (US); Russikesh Kumar, Upper Saddle River, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/812,302

(22) Filed: Nov. 14, 2017

(51) Int. Cl.
  *H05B 37/02* (2006.01)
  *H02H 7/20* (2006.01)
  *H02M 5/293* (2006.01)

(52) U.S. Cl.
  CPC ........... *H05B 37/0227* (2013.01); *H02H 7/20* (2013.01); *H02M 5/293* (2013.01); *H02M 2005/2935* (2013.01)

(58) Field of Classification Search
  CPC ..... H05B 37/0227; H02H 7/20; H02M 5/293; H02M 2005/2935
  USPC ....................................................... 315/119
  See application file for complete search history.

(56) References Cited

U.S. PATENT DOCUMENTS

| | | | |
|---|---|---|---|
| 7,242,563 B2 | 7/2007 | Hua et al. | |
| 8,085,160 B2 | 12/2011 | Vanderzon | |
| 8,208,235 B2 * | 6/2012 | Orchowski | H05B 39/044 327/425 |
| 8,698,466 B2 | 4/2014 | Vanderzon | |
| 9,071,051 B2 | 6/2015 | Sagona | |
| 9,279,835 B2 | 3/2016 | Russell et al. | |

(Continued)

OTHER PUBLICATIONS

Allegro MicroSystems, LLC, ACS709 High-Bandwidth, Fast Fault Response Current Sensor IC in Thermally Enhanced Package, Jun. 5, 2017, available at www.allegromicro.com/en/Products/Current-Sensor-ICs/Zero-To-Fifty-Amp-Integrated-Conductor-Sensor-ICs/ACS709.aspx.

*Primary Examiner* — Daniel D Chang
(74) *Attorney, Agent, or Firm* — Crestron Electronics, Inc

(57) ABSTRACT

A dimmer circuit for detecting a connected load type comprising a controller, a plurality of dimming transistors adapted to provide a dimmed hot output signal to a load, and a current sensor adapted to sense current levels of the dimmed hot output signal. The controller is adapted to store at least one load type current parameter associated with a dimming mode. The controller is further adapted to generate an asymmetric forward phase transistor drive signal with half cycles of one polarity having incrementally increasing dimming levels to drive the plurality of dimming transistors. The controller receives current levels from the current sensor and determines whether at least one of the received current levels satisfies at least one stored current parameter. When at least one current level satisfies at least one current parameter, the controller sets the dimmer to operate in a dimming mode associated with the satisfied current parameter. When the received current levels do not satisfy the stored at least one load type current parameter, the controller sets the dimmer to operate in a default dimming mode. The at least one current parameter may define one or more current events associated with a load type, such as an inrushing current event, double peaked current event, a lagging current event, or a substantially non-ratiometric current rise.

44 Claims, 12 Drawing Sheets

(56) References Cited

U.S. PATENT DOCUMENTS

| | | | | |
|---|---|---|---|---|
| 9,992,849 B1* | 6/2018 | Slivka | ............... | H05B 37/0227 |
| 2009/0284182 A1* | 11/2009 | Cencur | ............. | H05B 33/0815 |
| | | | | 315/307 |
| 2010/0289469 A1* | 11/2010 | Vanderzon | ............. | H05B 39/04 |
| | | | | 323/282 |
| 2013/0257406 A1* | 10/2013 | Hausman, Jr. | ............ | G05F 5/00 |
| | | | | 323/300 |

* cited by examiner

Voltage across Dimmer for Reverse-Phase with Overvoltage Event

AUTOMATIC LOAD DETECTION IN A DIMMER

BACKGROUND OF THE INVENTION

Technical Field

The present invention relates generally to load control devices, and more specifically to a method for automatically detecting the load type connected to a dimmer.

Background Art

Dimmers are used for varying light levels or intensity of lighting loads by controlling the amount of power that is delivered to the loads. Phase control dimming is one method of dimming lighting loads. Taking a sine waveform voltage signal, phase control dimming involves varying the amount of time voltage is applied to the load during a given half cycle. To dim the light to 50%, for example, power to the load may be provided for 50% of the half cycle and turned off during the remaining 50% of the half cycle.

Phase control dimming includes forward phase dimming (also called leading edge), reverse phase dimming (also called trailing edge), and center phase dimming. During forward phase dimming, as shown in FIG. 8A, the dimmer turns off during the front part of each half cycle (i.e., turns off at current zero crossing and turns on during the half cycle). In reverse phase dimming, as shown in FIG. 8B, the dimmer turns off during the rear part of each half cycle (i.e., turns on at zero crossing and turns off during the half cycle). In center phase dimming, as shown in FIG. 8C, the dimmer turns on and turns off during the half cycle. It is different than reverse and forward phase in that the turn on and turn off events do not occur at zero crossing of the half cycle. For example, in a positive half cycle, the dimmer turns on sometime after the positive zero crossing and turns off some time before the negative zero crossing. FIG. 8C illustrates an on-center phase dimming where the turn on time 806 is centered with a midpoint 805 of the half cycle. In an off-center phase dimming, the turn on time 806 is offset from the midpoint 805 and may entirely take place before the midpoint 805 (similar to reverse phase) or after the midpoint 805 (similar to forward phase).

Triode for alternating current (TRIAC) based dimmers can only dim in forward phase because they can only turn off when the current going through them goes to zero, which does not happen when dimming in reverse phase. On the other hand, field-effect transistor (FET) based dimmers can dim in either forward phase, reverse phase, or center phase.

While incandescent lighting loads can be dimmed in either phase, other types of lighting loads cannot. Inductive loads, for example, can only be dimmed in forward phase. If an inductive load were to be dimmed in reverse phase, when the voltage is turned off during the half cycle and the current is stopped abruptly, the voltage across the load would spike to compensate. Such a voltage spike 904 is illustrated in FIG. 9, which shows a voltage waveform across the dimmer for reverse phase. This occurrence is called an overvoltage event, which can cause failure of the dimmer circuit. Capacitive loads, on the other hand, may result in current spikes when dimmed in forward phase.

As such, special care needs to be taken in selecting the right dimmer and the correct dimming mode for the load type to avoid damage to the dimmer and/or the lighting load. Reverse phase dimmers may be used to dim incandescent loads, capacitive loads, electronic low voltage transformers, light emitting diode (LED) loads, and halogen lamps. Forward phase dimmers may be used to dim inductive loads, such as magnetic low voltage transformers, neon lights, or other inductive load types. Forward phase dimmers can be used for incandescent loads as well, although generally reverse phase is preferred. In addition, some fluorescent lights, which are normally considered electronic low voltage loads, may seem inductive because they are optimized to work in forward phase.

Universal dimmers have been introduced to obviate the need to select the right type of dimmer. Universal dimmers can dim in either forward or reverse phase using two FETs. Some dimmers allow their operating mode to be selected manually. Other dimmers use various detection circuit components to automatically detect the type of load connected to the dimmer at startup to decide whether to dim in reverse phase or forward phase. This is normally achieved by including a resistor divider across the FETs fed into a voltage peak detection circuit that is fed into a microcontroller through an analog-to-digital converter (ADC), which is reset at the start of every half cycle. At start up, the microcontroller may start dimming up the load in reverse phase at a low phase angle and measure the voltage at turn off to decide on the load type based on the detected peak voltage. Upon detecting that the voltage is above some threshold (i.e., detecting an overvoltage event at that phase angle), the microcontroller will determine that an inductive load is connected and switch to a forward phase operation. If the voltage is below the threshold, then the microcontroller determines that the connected load is not inductive.

However, such detection methods add additional circuitry with large components to the dimmer, such as large sized resistors capable of withstanding high voltage spikes, a transistor follower circuit, a sample and hold capacitor or detector, and another analog input to the microcontroller. The circuitry may also require an additional microcontroller on the FET common source node or a microcontroller on a HOT input node to read the voltage, and a separate microcontroller for the user interface. An additional isolator may also be required to reach a microcontroller at a different potential. In applications where the dimmer size needs to be small due to functional and esthetic reasons, for example in dimmers that need to fit inside a wall box, the addition of numerous additional and large components is undesired.

Additionally, the above methods purposefully force an overvoltage spike to occur in order to determine whether the measured voltage has exceeded a voltage threshold to detect the load type. Every time an overvoltage event occurs, it can cause detriment to the dimmer.

Accordingly, a need has arisen for a method for automatically detecting the load type connected to a dimmer without the addition of excessive circuit components and without subjecting the dimmer to overvoltage spikes.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for automatically detecting the load type connected to a dimmer that will obviate or minimize problems of the type previously described.

It is also an aspect of the embodiment to provide a dimmer capable of automatically detecting the load type connected to a dimmer without the addition of excessive circuit components and without subjecting the dimmer to overvoltage spikes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments, a dimmer circuit for detecting a connected load type is provided. The dimmer circuit comprises a controller, a plurality of dimming transistors adapted to provide a dimmed hot output signal to a load, and a current sensor adapted to sense current levels of the dimmed hot output signal. The controller stores at least one load type current parameter associated with a dimming mode. The controller is adapted to generate an asymmetric forward phase transistor drive signal with half cycles of one polarity having incrementally increasing dimming levels to drive the plurality of dimming transistors. The controller is further adapted to receive current levels from the current sensor and determine whether at least one of the received current levels satisfies at least one stored current parameter. When at least one current level satisfies at least one current parameter, the controller sets to operate in a dimming mode associated with the satisfied current parameter. When the received current levels do not satisfy the stored at least one load type current parameter, the controller sets to operate in a default dimming mode. According to an embodiment, the default dimming mode comprises a reverse phase dimming mode.

According to one embodiment, the transistor drive signal comprises half cycles of opposite polarity to the one polarity having a substantially constant dimming level. According to another embodiment, the transistor drive signal comprises half cycles of opposite polarity to the one polarity having a substantially zero dimming level. According to various embodiments, the half cycles of one polarity comprise one of positive half cycles or negative half cycles. The controller may incrementally increase the dimming levels of the half cycles of one polarity until: (i) at least one of the received current levels satisfies the at least one current parameter, or (ii) reaching a dimming level threshold.

According to an embodiment, the controller is further adapted to: set a dimming level of a first half cycle of the one polarity of the transistor drive signal to a first dimming level; and incrementally increase a dimming level of each subsequent half cycle of the one polarity by a predetermined increment value.

According to one embodiment, the current sensor is further adapted to detect an overcurrent event when a sensed current level is above an overcurrent fault threshold. The dimmer circuit may further comprise an overvoltage protection device adapted to being triggered during an overvoltage event.

According to an embodiment, the controller may comprise a counter that counts the number of times the received current levels satisfy the at least one current parameter before setting to operate in the dimming mode associated with the satisfied current parameter. According to another embodiment, the controller is further adapted to set at least one dimming parameter associated with the satisfied current parameter. The at least one dimming parameter may comprise a dimming curve, a minimum dimming level, a maximum dimming level, any combinations thereof, or the like. The at least one load type current parameter may comprise a rule, a predetermined threshold, a current level sampling time, any combinations thereof, or the like.

According to an embodiment, the at least one current parameter may define an inrushing current event. The controller may be further adapted to determine whether at least one of the received current levels satisfies the at least one parameter of the inrushing current event, and set to operate in a reverse phase dimming mode upon detecting the inrushing current event. According to an embodiment, the controller may detect the inrushing current event by identifying a first current level peak during an expected voltage rising edge of a half cycle of the dimmed hot output signal, identifying a steady state current level peak after the expected voltage rising edge, and detecting the inrushing current event when the first current level peak is larger than the steady state current level peak by a predetermined threshold. According to an embodiment, the controller may identify the connected load as a capacitive load upon detecting the inrushing current event. The controller may further determine a dimming curve for the identified capacitive load by dimming up the connected load to determine at what low level the load starts drawing a consistent amount of current and at what high level the load's current draw stops or slows increasing.

According to another embodiment, the at least one current parameter may define a current waveform shape of a half cycle that corresponds to a load type. According to a further embodiment, the at least one current parameter may define a double peaked current event. The controller may be further adapted to determine whether at least one of the received current levels satisfies the at least one parameter of the double peaked current event, and set to operate in a forward phase dimming mode upon detecting the double peaked current event. According to one embodiment, the controller may detect the double peaked current event by identifying a first current level peak in a half cycle and a subsequent second current level peak in the half cycle, such that there is at least one current level drop between the first current level peak and the second current level peak that is smaller than both the first current level peak and the second current level peak. Alternatively, or in addition, the controller may detect the double peaked current event by identifying a first current level peak and a subsequent second current level peak, and detecting the double peaked current event when the second current level peak is larger than the first current level peak. Furthermore, the controller may detect the double peaked current event by: identifying a first current level peak and a subsequent second current level peak, and detecting the double peaked current event when the second current level peak is larger than the first current level peak by a predetermined threshold.

According to yet another embodiment, the at least one current parameter may define a lagging current event. The controller may be further adapted to determine whether at least one of the received current levels satisfies the at least one parameter of the lagging current event, and set to operate in a forward phase dimming mode upon detecting the lagging current event. According to an embodiment, the controller may detect the lagging current event by determining whether at least one of the received current levels of a half cycle lags an expected voltage zero cross of the dimmed hot output signal. According to a further embodiment, the controller may detect the lagging current event by determining whether a sensed current level at a set time after an expected voltage zero cross of the dimmed hot output signal is larger than a current level threshold.

According to another embodiment, the at least one current parameter may define a non-ratiometric current event. The controller may be further adapted to determine whether the received current levels comprise a current rise that is substantially non-ratiometric to an expected voltage rise, and when determining that the current rise is substantially non-ratiometric, set to operate in a forward phase dimming mode. According to an embodiment, when determining that the current rise is substantially ratiometric, the controller may be further adapted to set to operate in a reverse phase dimming mode. According to an embodiment, the controller may determine that that the current rise is substantially ratiometric when the dimming level of the transistor drive signal reached a dimming level threshold without detecting that the current rise is substantially non-ratiometric.

According to another aspect of the embodiments, a dimmer circuit for detecting a connected load type is provided comprising a controller, a plurality of dimming transistors adapted to provide a dimmed hot output signal to a load, and a current sensor adapted to sense current levels of the dimmed hot output signal. The controller is adapted to generate an asymmetric forward phase transistor drive signal comprising positive or negative half cycles of incrementally increasing dimming levels to drive the plurality of dimming transistors. The controller is further adapted to receive the current levels from the current sensor, determine whether the received current levels comprise a current rise that is substantially non-ratiometric to an expected voltage rise, and when determining that the current rise is substantially non-ratiometric, set to operate in a forward phase dimming mode. According to an embodiment, when determining that the current rise is substantially ratiometric, the controller is further adapted to set to operate in a reverse phase dimming mode. According to a further embodiment, the controller may determine that that the current rise is substantially ratiometric when the dimming level of the transistor drive signal reached a dimming level threshold without detecting that the current rise is substantially non-ratiometric.

According to a further aspect of the embodiments, a dimmer circuit for detecting a connected load type is provided comprising a controller, a plurality of dimming transistors adapted to provide a dimmed hot output signal to a load, and a current sensor adapted to sense current levels of the dimmed hot output signal. The controller is adapted to generate a forward phase transistor drive signal to drive the plurality of dimming transistors, receive current levels from the current sensor, detect an inrushing current event, and set to operate in a reverse phase dimming mode upon detecting the inrushing current event. The controller detects the inrushing current event when a first current level peak detected during an expected voltage rising edge of a half cycle of the dimmed hot output signal is larger than a steady state current level peak detected after the expected voltage rising edge. According to an embodiment, the transistor drive signal may comprise an asymmetric transistor drive signal with positive or negative half cycles of incrementally increasing dimming levels. The controller may be further adapted to set to operate in a default dimming mode when the inrushing current event is not detected. According to a further embodiment, the controller identifies the connected load as a capacitive load upon detecting the current inrush event.

According yet to a further aspect of the embodiments, a dimmer circuit for detecting a connected load type is provided comprising a controller, a plurality of dimming transistors adapted to provide a dimmed hot output signal to a load, and a current sensor adapted to sense current levels of the dimmed hot output signal. The controller is adapted to generate an asymmetric forward phase transistor drive signal with half cycles of one polarity having incrementally increasing dimming levels to drive the plurality of dimming transistors. The controller is further adapted to receive current levels from the current sensor, detect a double peaked current event, and set to operate in a forward phase dimming mode upon detecting the double peaked current event. The controller detects the double peaked current event by identifying a first current level peak in a half cycle and a subsequent second current level peak in the half cycle, such that there is at least one current level drop between the first current level peak and the second current level peak that is smaller than both the first current level peak and the second current level peak. The controller may be further adapted to set to operate in a default dimming mode when the double peaked current event is not detected. According to a further embodiment, the controller detects the double peaked current when the second current level peak is larger than the first current level peak. According to yet a further embodiment, the controller detects the double peaked current when the second current level peak is larger than the first current level peak by a predetermined threshold.

According to another aspect of the embodiments, a dimmer circuit for detecting a connected load type is provided comprising a controller, a plurality of dimming transistors adapted to provide a dimmed hot output signal to a load, and a current sensor adapted to sense current levels of the dimmed hot output signal. The controller is adapted to generate a forward phase transistor drive signal to drive the plurality of dimming transistors, receive current levels from the current sensor, detect a lagging current event, and set to operate in a forward phase dimming mode upon detecting the lagging current event. The controller detects the lagging current event when at least one of the received current levels of a half cycle lags an expected voltage zero cross of the dimmed hot output signal. According to an embodiment, the transistor drive signal may comprise an asymmetric transistor drive signal with positive or negative half cycles of incrementally increasing dimming levels. According to an embodiment, the controller detects the lagging current event when a sensed current level at a set time after an expected voltage zero cross is larger than a current level threshold. According to another embodiment, the controller is adapted to set to operate in a default phase dimming mode upon not detecting the lagging current event.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not

BRIEF DESCRIPTION OF THE SEVERAL VIEWS OF THE DRAWINGS

Figure 1:
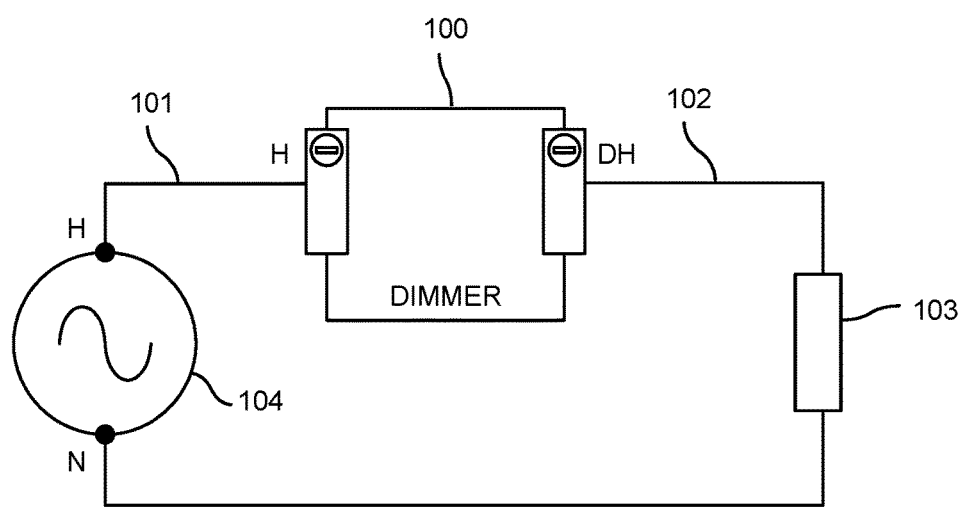

FIG. 1 shows a dimmer in accordance with an illustrative embodiment.

Figure 2:
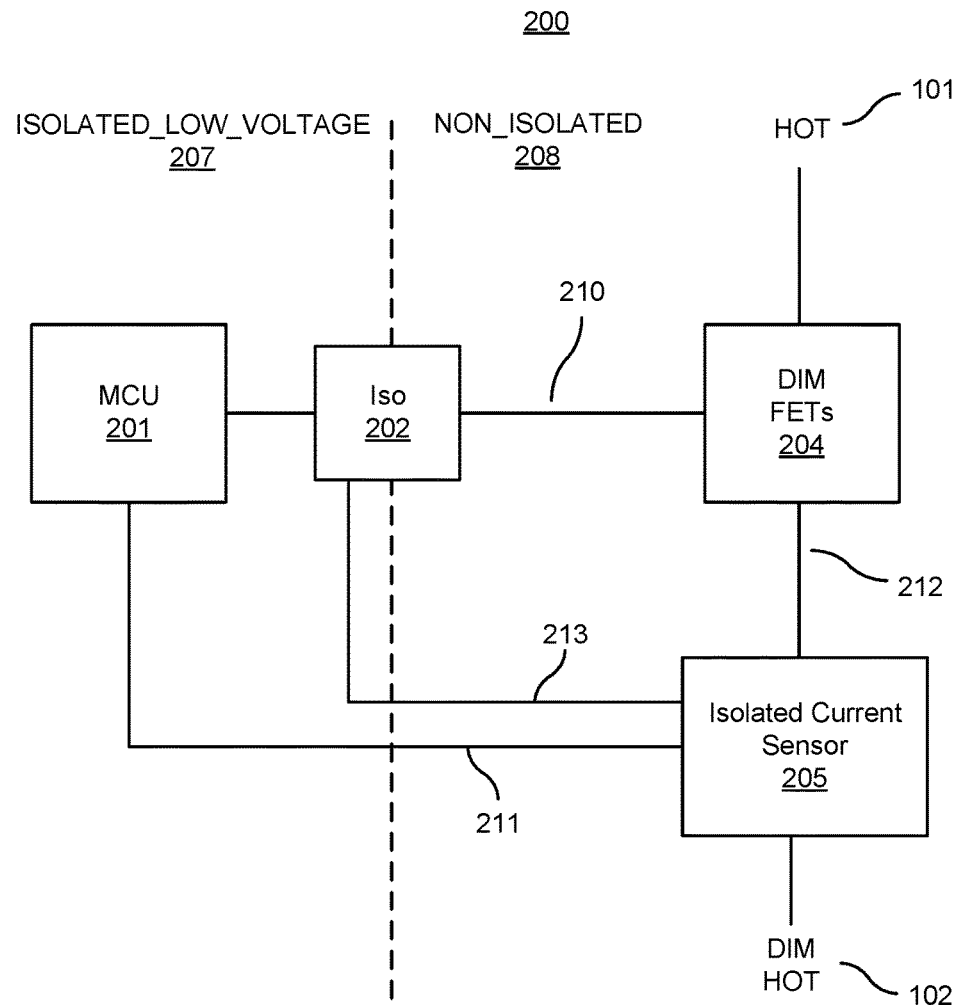

FIG. 2 shows a load control circuit of the dimmer in accordance with an illustrative embodiment.

Figure 3:
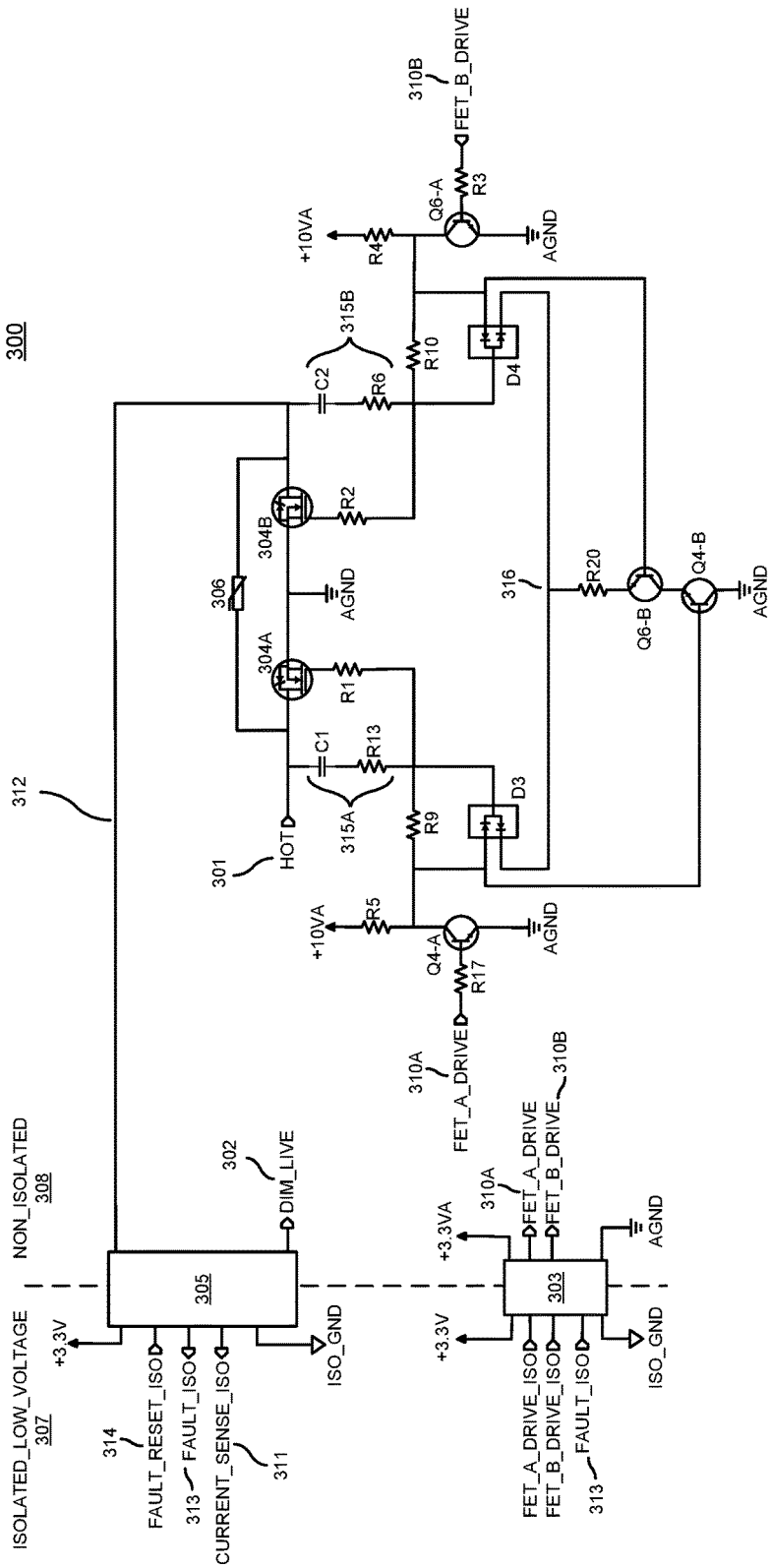

FIG. 3 shows a detailed load control circuit of the dimmer in accordance with an illustrative embodiment.

Figure 4:
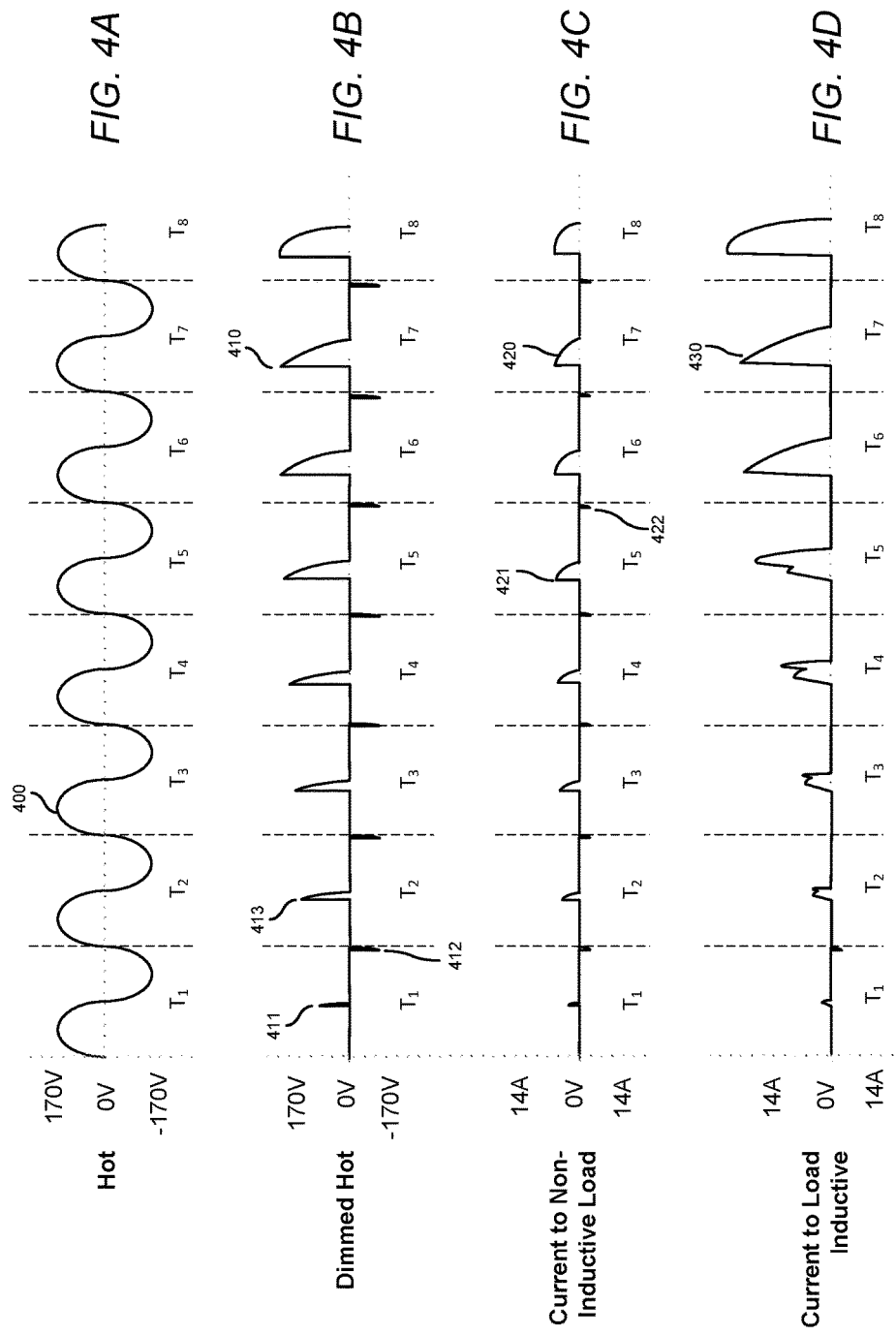

FIG. 4A shows an exemplary AC voltage waveform of the AC power hot signal fed into the dimmer in accordance with an illustrative embodiment.

FIG. 4B shows an exemplary asymmetric forward phase voltage waveform of the dimmed hot output signal used to drive the connected load in order to identify the load type in accordance with an illustrative embodiment.

FIG. 4C shows an exemplary current waveform of the dimmed hot output signal outputted from the dimmer and measured by the current sensor when the dimmer is connected to a non-inductive load in accordance with an illustrative embodiment.

FIG. 4D shows an exemplary current waveform of the dimmed hot output signal outputted from the dimmer and measured by the current sensor when the dimmer is connected to an inductive load in accordance with an illustrative embodiment.

Figure 5:
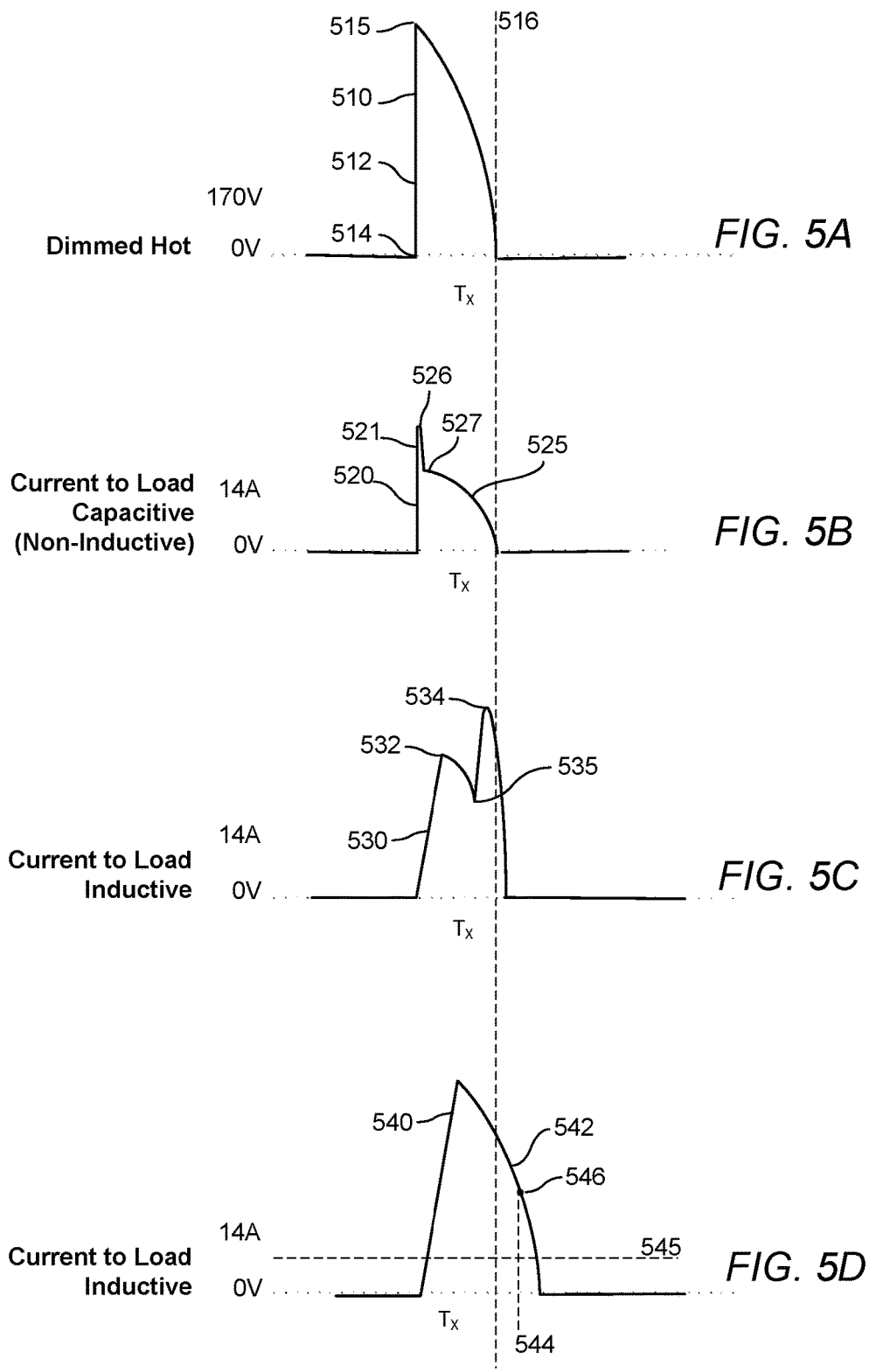

FIG. 5A shows an exemplary positive half cycle of a forward phase voltage waveform of the dimmed hot output signal used to drive the connected load in order to identify the load type in accordance with an illustrative embodiment.

FIG. 5B shows an exemplary positive half cycle of a current waveform of the dimmed hot output signal measured by the current sensor illustrating an inrushing current event when the dimmer is connected to a capacitive load in accordance with an illustrative embodiment.

FIG. 5C shows an exemplary positive half cycle of a current waveform of the dimmed hot output signal measured by the current sensor illustrating a double peaked current event when the dimmer is connected to an inductive load in accordance with an illustrative embodiment.

FIG. 5D shows an exemplary positive half cycle of a current waveform of the dimmed hot output signal measured by the current sensor illustrating a lagging current event when the dimmer is connected to an inductive load in accordance with an illustrative embodiment.

Figure 6:
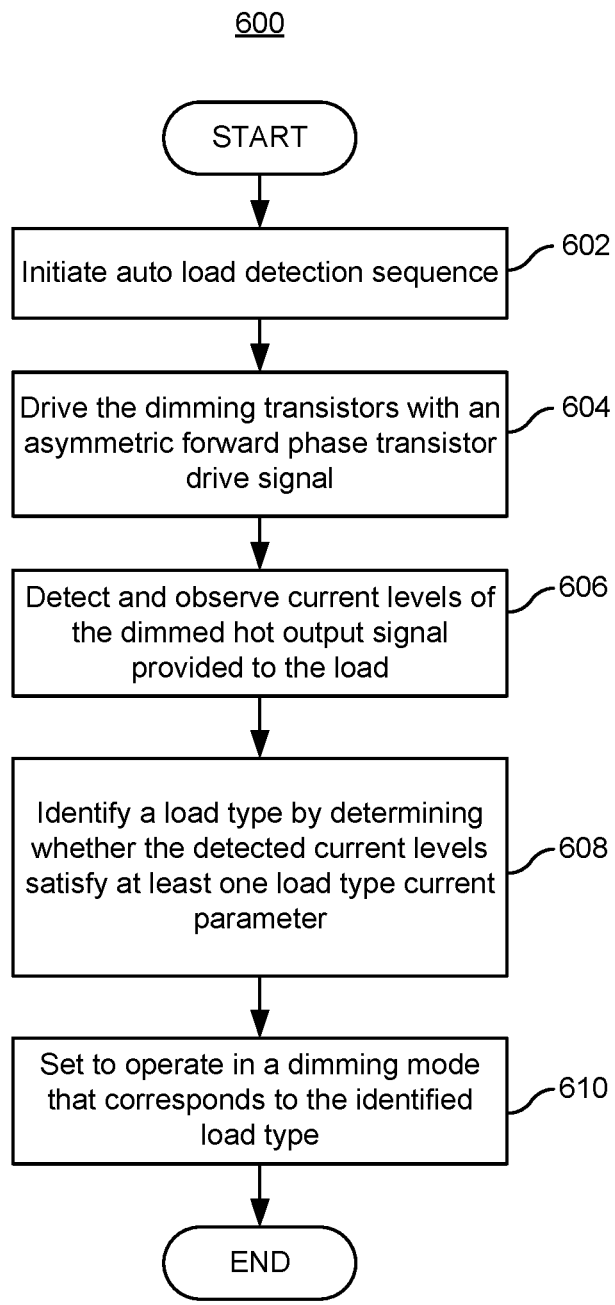

FIG. 6 shows a flowchart illustrating the steps of the method for automatically detecting the load type connected to the dimmer in accordance with an illustrative embodiment.

FIG. 7A-7D show a flowchart illustrating the steps of the method for automatically detecting the load type connected to the dimmer in a greater detail, in accordance with an illustrative embodiment.

Figure 8A:
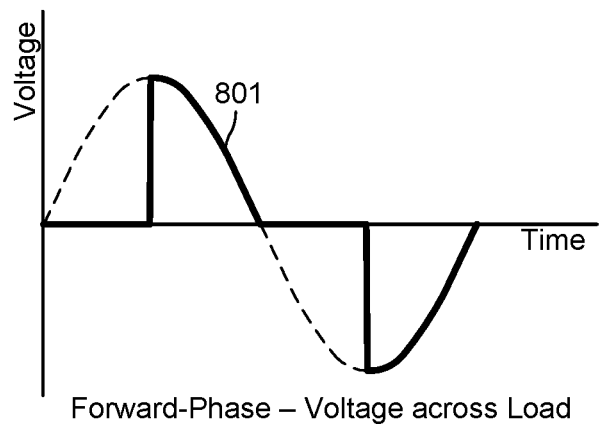

FIG. 8A shows an exemplary voltage waveform of a forward phase dimmed hot output signal across the load in accordance with an illustrative embodiment.

Figure 8B:
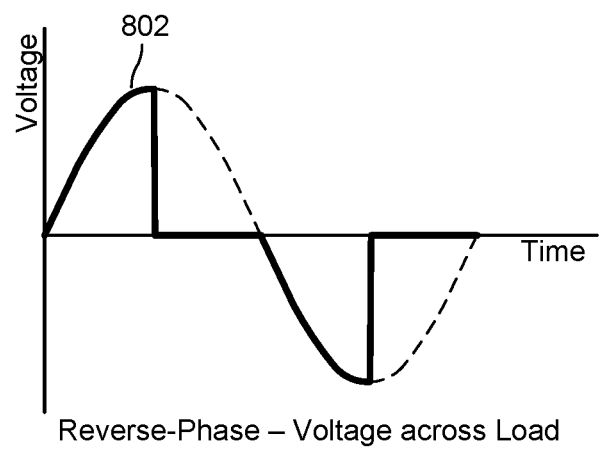

FIG. 8B shows an exemplary voltage waveform of a reverse phase dimmed hot output signal across the load in accordance with an illustrative embodiment.

Figure 8C:
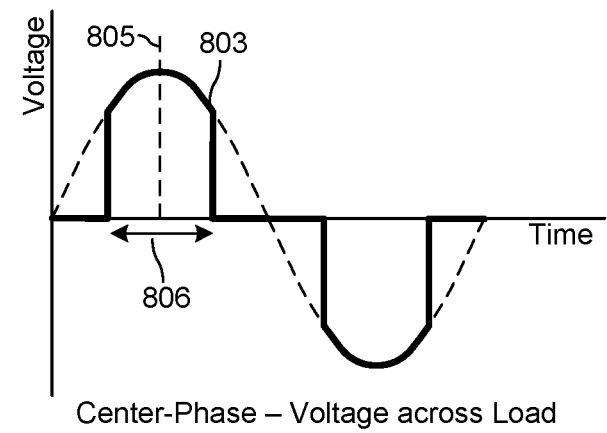

FIG. 8C shows an exemplary voltage waveform of a center phase dimmed hot output signal across the load in accordance with an illustrative embodiment.

Figure 9:
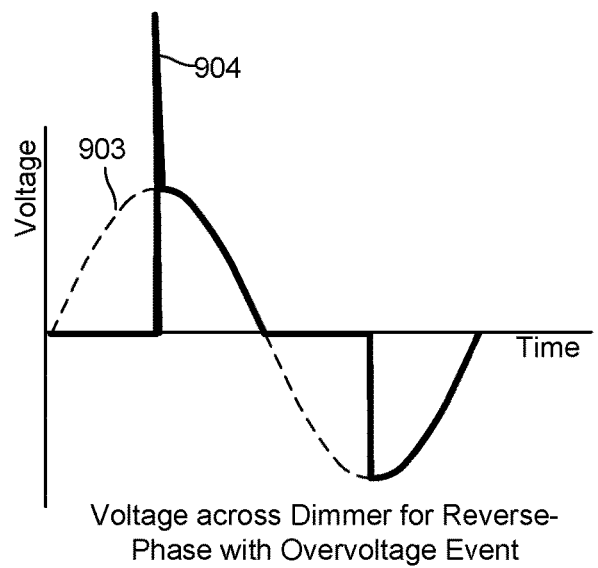

FIG. 9 shows an exemplary voltage waveform across the dimmer for reverse phase with an overvoltage event in accordance with an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices described herein.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Dimmer
101 Alternating Current (AC) Power Hot Signal
102 Dimmed Hot Output Signal
103 Load
104 AC Power Source
200 Load Control/Dimmer Circuit
201 Microcontroller (MCU)
202 Isolator
204 Dimming Transistors
205 Isolated Current Sensor
207 Low-Voltage Side
208 High-Voltage Side
210 Transistor Drive Signal
211 Current Sensor Output Signal
212 Dimmed Hot Signal
213 Overcurrent Output Signal
300 Load Control Circuit
301 AC Power Hot Signal
302 Dimmed Hot Output Signal or DIM_LIVE Signal
303 Isolator
304A Dimming FET Transistor
304B Dimming FET Transistor
305 Hall Effect Current Sensor
306 Overvoltage Protection (OVP) Device
307 Low-Voltage Side 308 High-Voltage Side
310A FET_A_DRIVE Signal
310B FET_B_DRIVE Signal
311 Current Sensor Output Signal or CURRENT_SENSE Signal
312 Dimmed Hot Signal
313 FAULT Signal
314 FAULT_RESET Signal
315A Resistor-Capacitor (RC) Circuit
315B RC Circuit
316 Over Current Fast Turn OFF Circuit
400 AC Voltage Waveform of the AC Power Hot Signal Fed to the Dimmer
410 Asymmetric Forward Phase Voltage Waveform of the Dimmed Hot Output Signal Used to Drive the Connected Load In Order To Identify the Load Type
411 Initial Positive Phase Angle/Dimming Level
412 Initial Negative Phase Angle/Dimming Level
413 Phase Angle/Dimming Level
420 Current Waveform of the Dimmed Hot Output Signal Outputted From the Dimming Transistors and Measured by the Current Sensor When the Dimmer Is Connected to a Non-Inductive Load
421 Positive Current Level
422 Negative Current Level
430 Current Waveform of the Dimmed Hot Output Signal Outputted From the Dimming Transistors and Measured By the Current Sensor When the Dimmer Is Connected to an Inductive Load
510 Positive Half Cycle of a Forward Phase Voltage Waveform of the Dimmed Hot Output Signal Used to Drive the Connected Load In Order to Identify the Load Type
512 Voltage Rising Edge
514 Voltage Turn On
515 Voltage Peak
516 Voltage Waveform Zero Crossing
520 Positive Half Cycle of a Current Waveform of the Dimmed Hot Output Signal Measured by the Current Sensor Illustrating an Inrushing Current Event When the Dimmer is Connected to a Capacitive Load
521 Current Inrush Spike
525 Current in the Remainder of the Half Cycle After Inrush Spike
526 First Current Peak During Voltage Rising Edge
527 Steady state Current Peak After Voltage Rising Edge
530 Positive Half Cycle of a Current Waveform of the Dimmed Hot Output Signal Measured by the Current Sensor Illustrating a Double Peaked Current Event When the Dimmer is Connected to an Inductive Load
532 First Current Peak
534 Second Current Peak
535 Current Level Drop
540 Positive Half Cycle of a Current Waveform of the Dimmed Hot Output Signal Measured by the Current Sensor Illustrating a Lagging Current Event When the Dimmer is Connected to an Inductive Load
542 Portion of the Current Waveform extending beyond Voltage Waveform Zero Crossing
544 Set Time After Voltage Zero Crossing
545 Current Level Threshold
546 Observed Current Level at the Set Time After Voltage Zero Crossing
600 Flowchart Illustrating the Steps of a Method for Automatically Detecting the Load Type Connected to the Dimmer
602-610 Steps of Flowchart 400
700 Flowchart Illustrating the Steps of a Method for Automatically Detecting the Load Type Connected to the Dimmer in a Greater Detail
702-759 Steps of Flowchart 500
801 Voltage Waveform of a Forward Phase Dimmed Hot Output Signal across the load
802 Voltage Waveform of a Reverse Phase Dimmed Hot Output Signal across the load
803 Voltage Waveform of a Center Phase Dimmed Hot Output Signal across the load
805 Midpoint of Voltage Waveform Half Signal
806 Turn-On Time
903 Voltage Waveform of a Reverse Phase Dimmed Hot Output Signal with an Overvoltage Event across the dimmer
904 Voltage Spike

LIST OF ACRONYMS USED IN THE SPECIFICATION IN ALPHABETICAL ORDER

The following is a list of the acronyms used in the specification in alphabetical order.
AC Alternating Current
ADC Analog-to-Digital Converter
ASIC Application Specific Integrated Circuit
C Capacitor
CMOS Complementary Metal-Oxide-Semiconductor
CPU Central Processing Unit
D Diode
$D_1$ First Dimming Level
$D_2$ Second Dimming Level
$D_A$ Dimming Level of Positive Dimming Transistor
$D_B$ Dimming Level of Negative Dimming Transistor
DC Direct Current
$D_{TH}$ Dimming Level Threshold
EEPROM Electrically Erasable Programmable Read-Only Memory
ESD Electrostatic Discharge
FET Field-Effect Transistor
GDT Gas Discharge Tube
Hz Hertz
I Current
IGBT Insulated-Gate Bipolar Transistor
LED Light Emitting Diode
MCU Microcontroller
MOSFET Metal Oxide Semiconductor Field Effect Transistor
MOV Metal-Oxide Varistor
N Predetermined Increment Value
NPN Negative-Positive-Negative
OVP Overvoltage Protection
PCB Printed Circuit Board
PNP Positive-Negative-Positive
Q Transistor
R Resistor
RAM Random-Access Memory
RC Resistor-Capacitor Circuit
ROM Read-Only Memory
T Cycle
TRIAC Triode for Alternating Current
TVS Transient-Voltage-Suppression
V Volt/Voltage

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of load control devices, and more specifically to a method for automatically detecting the load type connected to the dimmer but is not limited thereto, except as may be set forth expressly in the appended claims. According to one embodiment, the dimmer may comprise a universal dimmer that can automatically determine the connected load type and set to operate in a dimming mode that corresponds to the identified load type. For example, the dimmer may operate in a reverse phase dimming mode when determining that the connected load is a non-inductive load or a forward phase dimming mode upon detecting an inductive load type. Accordingly, the universal dimmer described herein may provide dimming control to various types of loads. For example, the dimmer may dim the following loads in reverse phase: incandescent loads, capacitive loads, electronic low voltage transformers, light emitting diode (LED) loads, halogen lamps, or other types of non-inductive loads. The dimmer may set to operate in a forward phase mode upon detecting that an inductive load has been connected, such as magnetic low voltage transformers, neon lights, or other inductive load types. The dimmer may further use the identified load type information to set other dimming parameters, such as dimming curves.

Beneficially, as described in greater detail below, the dimmer of the present embodiments is adapted to automatically detecting the connected load type in transistor based phase control dimmers. Automatically detecting the attached load type helps to select the proper dimming mode for the attached load type and prevents overvoltage situations across the dimming transistors. The dimmer of the present embodiments measures current levels with a current sensor that is already present on these types of dimmers for overcurrent detection and protection. According to the present embodiments, the microcontroller of the dimmer will drive the connected load asymmetrically and measure the current levels on the dimmer output to detect various current events and in response identify the load type, as described below in a greater detail.

As such, the dimmer of the present embodiments may be used for automatic load detection in transistor based phase dimmers without having to use any additional components, such as large sized resistors capable of absorbing high voltage spikes, a transistor follower circuit, a sample and hold capacitor or detector, another analog input to the microcontroller, or additional microcontrollers. Additionally, the dimmer described herein is capable of automatically detecting the connected load type without subjecting the dimmer to potentially damaging overvoltage spikes. Accordingly, the detection method described herein simplifies the dimmer circuit design, reduces the printed circuit board (PCB) real estate and thereby dimmer size, and saves cost.

FIG. 1 shows a dimmer 100 in accordance with an illustrative embodiment. The dimmer 100 may be connected in series with an alternating current (AC) power source 104, such as an AC mains power source, to receive electric AC power hot signal 101. In an embodiment of the invention, the AC power source 104 may comprise 120 Volt (V) 60 Hertz (Hz) AC mains residential power supply. In other embodiments, the AC power source may supply power at a different voltage or frequency. For example, in another embodiment, the AC power source may supply 230V 50 Hz AC mains power supply. The dimmer 100 may comprise a user interface (not shown), such as an actuator, a button, a touch screen, or the like, which receives an input from a user indicating the desired dimming level. According to another embodiment, the dimmer may be controlled remotely as well through a wired or wireless interface. The dimmer 100 may use this user input to produce dimmed hot output signal 102 to a connected load 103 at a particular voltage level corresponding to the desired dimming level. As discussed above, the load 103 may comprise an inductive or a non-inductive load known in the art.

Referring now to FIG. 2, there is shown a load control or dimmer circuit 200 of dimmer 100 according to an illustrative embodiment. The load control circuit 200 may comprise a microcontroller (MCU) 201, an isolator 202, an isolated current sensor 205, and dimming transistors 204. The load control circuit 200 may comprise additional circuit components known in the art for providing additional functions to the dimmer 100. For example, the load control circuit 200 may comprise a power supply (not shown) for converting the incoming AC power signal to a direct current (DC) power signal for powering the various components of the load control circuit 200, including the MCU 201.

The MCU 201 may comprise at least one central processing unit (CPU) that can represent one or more microprocessors, "general purpose" microprocessors, special purpose microprocessors, application specific integrated circuits (ASICs), or any combinations thereof. MCU 201 can provide processing capability to provide processing for one or more of the techniques and functions described herein. The MCU 201 may also comprise an internal memory, or be connected to an external memory, that can store data and executable code, such as volatile memory, nonvolatile memory, read-only memory (ROM), random-access memory (RAM), electrically erasable programmable read-only memory (EEPROM), flash memory, a hard disk drive, or other types of memory. The MCU 201 may also include a wired or wireless interface configured for receiving remote control.

According to an embodiment, dimming transistors 204 may comprise a pair of dimming transistors coupled in series in a common source configuration between the AC power source to receive AC power hot signal 101 and the dimmer output to provide the dimmed hot output signal 102 to the load 103. The dimming transistors 204 may be connected to the current sensor 205 via dimmed hot signal 212 or HOT signal 101. The dimming transistors 204 may be connected to the MCU 201 through a galvanic isolator 202 configured for galvanically isolating a high-voltage side 208 of the load control circuit 200 from the low-voltage side 207 of the load control circuit 200 for safety and to suppress electrical noise to protect the MCU 201 from line-voltage fluctuations. Isolator 202 may comprise a digital isolator having a semiconductor based isolation barrier. In another embodiment, isolator 202 may comprise a digital field-effect transistor (FET) driver, an optical isolator, or another type isolator known in the art. In yet another embodiment, the dimming transistors 204 may be directly connected to the MCU 201 without isolation.

Dimming transistors 204 may receive a transistor drive signal 210 from the MCU 201 directing each of the transistors 204 to be conductive or non-conductive for portion of a half-cycle of the AC power signal 101 to control the amount of power delivered to the connected load 103 as is known in the art. Dimming transistors 204 may comprise field-effect transistors (FETs), and more particularly n-channel metal oxide semiconductor field effect transistors (MOSFETs). Although the load control circuit 200 may also be implemented using other types of n-channel transistors, such as n-channel negative-positive-negative (NPN) type transistors, insulated-gate bipolar transistors (IGBT), or the like. Using other types of transistors, however, requires the addition of a freewheel diode.

The current sensor 205 may be connected between the dimming transistors 204 and the load 103 or between the dimming transistors 204 and the HOT signal 101. The current sensor 205 is configured for sensing the current level outputted from the dimming transistors 204 to the load 103. The current sensor 205 may be connected to the MCU 201 to transmit a current sensor output signal 211 containing the detected current levels. According to one embodiment, the current sensor 205 may be isolated from the MCU 201. The current sensor 205 may, for example, comprise a Hall Effect sensor. Although the current sensor 205 may alternatively comprise a current transformer, a current sense resistor with an analog isolator, or another type of current sensor known in the art. A Hall Effect current sensor is a sensor type that has both current detection and isolation included in the same component, with isolated inputs and output, allowing the Hall Effect current sensor to be used in applications requiring electrical isolation without the use of additional isolators. In another embodiment, an additional isolator (not shown) may be included between the current sensor 205 and the MCU 201 to provide isolation. According to yet another embodiment, the current sensor 205 may be directly connected to the MCU 201 and not be isolated from the MCU 201.

The current sensor 205 may also be connected to the gates of the dimming transistors 204, either directly or through isolator 202, to output an overcurrent output signal 213 to turn off the dimming transistors 204 upon detecting an overcurrent event. In another embodiment, the overcurrent detection would be accomplished with one or more comparators with a reference using the current sensor output signal 211. A current sensor 205 is typically included in a dimmer for detecting overcurrent events. It is used in conjunction with transistors 204 as an electronic circuit breaker. If there is a short circuit on the dimmed hot output signal 102 or a large inrush current into load 103, and the dimmer 100 starts to dim up, the current sensor 205 will detect a spike in the current. If the sensed current is above an overcurrent fault threshold, the current sensor 205 may generate an overcurrent output signal or drive signal 213 to turn the dimming transistors 204 off. Beneficially, according to the present embodiments, the current sensor 205 may also be used for detecting the connected load type without the addition of any components for detecting or measuring voltage, as will be described in greater detail below. In addition, the load control circuit may comprise other configurations capable of providing forward or reverse phase dimming as well as current detection.

FIG. 3 shows an exemplary detailed load control circuit 300, similar to load control circuit 200, according to an illustrative embodiment. The MCU 201 (not shown) is located on the isolated low voltage side 307 of the circuit 300. It provides a transistor drive signal, including a FET_A_DRIVE signal 310A and FET_B_DRIVE signal 310B, to the gates of the pair of dimming FET transistors 304A and 304B, respectively, at the high voltage side 308 of the circuit 300 through isolator 303. The isolator 303 may output a voltage lower than required by the pair of dimming FET transistors 304A and 304B. For example, the isolator may provide 3.3V, while the dimming FET transistors 304A and 304B need about 6.5V to be able to turn on. Transistors Q4-A and Q6-A may be provided between the isolator 303 and the dimming FET transistors 304A and 304B, respectively, to vary the voltage between about 3.3V and about 12V.

The pair of dimming FET transistors 304A and 304B may be coupled in series in a common source configuration—the source of transistor 304A is connected to the source of transistor 304B. The drain of transistor 304A may be connected to the AC power source to receive AC power HOT signal 301 and the drain of transistor 304B may be connected to the Hall Effect current sensor 305 to provide dimmed hot signal 312. The transistor drive signals 310A and 310B turn the dimming transistors 304A and 304B on and off to yield a dimmed hot output signal 302 of alternating polarity, as is understood by a person of ordinary skill in the art. For example, FET_A_DRIVE signal 310A may turn on transistor 304A for a portion of the positive half cycle and turn off transistor 304A for the remaining portion of the positive half cycle while transistor 304B is ON. FET_B_DRIVE signal 310B may turn on transistor 304B for a portion of the negative half cycle and turn off transistor 304B for the remaining portion of the negative half cycle while transistor 304A is ON. FIG. 8A illustrates an exemplary voltage waveform of a forward phase dimmed hot output signal 801 across the load, FIG. 8B illustrates an exemplary voltage waveform of a reverse phase dimmed hot output signal 802 across the load, and FIG. 8C illustrates an exemplary voltage waveform of a center phase dimmed hot output signal 803 across the load.

According to an embodiment, the load control circuit 300 may further comprise an overvoltage protection (OVP) device 306 connected across the pair of dimming FET transistors 304A and 304B at each of their drains. According to another embodiment, the load control circuit 300 may comprise a plurality of OVP devices connected across each of the dimming transistors 304A and 304B. The OVP device 306 is configured for providing protection for the load control circuit 300 during overvoltage events. The OVP device 306 may comprise a crowbar that in a case of an overvoltage event may divert or shut down voltage spikes from the load control circuit 300 by having the dimming transistors 304A and 304B absorb the energy to clamp the voltage. In another embodiment, the OVP device 306 may comprise a clamp that during an overvoltage event may clamp the load control circuit 300 to a predetermined voltage value. This predetermined voltage value is defined by the voltage rating of the dimming transistors 304A and 304B, which is typically 650V. According to various aspects of the embodiments, the OVP device 306 may comprise various types of OVP devices or combination of devices in a circuit, such as, but not limited to a varistor, a metal-oxide varistor (MOV), a transient voltage suppression (TVS) device, a thyristor surge protection device, a polymer electrostatic discharge (ESD) suppressor device, a gas discharge tube (GDT), any combinations thereof, or other OVP devices known in the art. The OVP device may also comprise an active freewheeling path located between the dimmed hot signal 312 and neutral (i.e., not across the dimming transistors 304A and 304B). Such active freewheeling path may consist of back to back FETs that turn on and off based on the dimming transistor and/or the AC line voltage or the DIM_LIVE signal 302. In another embodiment, the active freewheeling path could also consist of a thyristor (e.g., SIDAC, DIAC, or the like) that is triggered by overvoltage events, and which when triggered forces the dimming transistors 304A and 304B to turn off. Although other types of active freewheeling path devices may be used.

The Hall Effect current sensor 305 measures the current level of the dimmed hot signal 312 and provides a current sensor output signal or CURRENT_SENSE signal 311 containing the detected current level to the MCU 201. It also provides the dimmed hot output signal or DIM_LIVE signal 302 to the connected load 103. The current sensor 305 may also output a FAULT signal 313 through isolator 303 to turn off the dimming transistors 304A and 304B when the detected current exceeds an overcurrent fault threshold. The MCU 201 may send a FAULT_RESET signal 314 to the current sensor 305 to reset the FAULT latch before the next half cycle.

Two resistor-capacitor (RC) circuits 315A and 315B may be connected to and provide feedback to the gate of each dimming FET transistor 304A and 304B. RC circuit 315A includes capacitor C1 and resistor R13 and RC circuit 315B includes capacitor C2 and resistor R6. The slew rate or transition time from an ON to OFF state of the dimming FET transistors 304A and 304B is dictated by respective RC circuits 315A and 315B in combination with the drive impedance, which is dictated by R5, R9, R4, and R10, as well as D3 and D4. Slew rate is the change of voltage per unit of time. The transition time may be directed by changing the values of the components in these RC circuits 315A and 315B or by changing the drive impedance.

Diode pairs D3 and D4 serve a dual purpose. The top diodes in the diode pairs D3 and D4 are provided to allow the turn on time and turn off time of dimming transistors 304A and 304B to be symmetrical. The bottom diode in the diode pairs D3 and D4 are fed to two positive-negative-positive (PNP) transistors Q6-B and Q4-B, which make up the fast for overcurrent trip turn off circuit 316. When both of the dimming transistors 304A and 304B turn off at the same time, it is considered a fast turn off for an overcurrent trip, which will cause transistors Q6-B and Q4-B to turn on. As a result, the FET drive bypasses the slew rate limiting resistors R9 and R10, and goes straight to the PNP transistors Q6-B and Q4-B through resistor R20, which is a significantly lower impedance.

In order to detect the connected load type, the present embodiments rely on the principle that when the AC current through inductive loads, such as magnetic low voltage transformers, is asymmetric (DC biased), the inductive load will saturate in the direction that the current was biased in. Thus, in order to identify the load type, the MCU 201 drives the load 103 asymmetrically in forward phase at a very low phase angle, or dimming level. The MCU 201 may then slowly increase the phase angle, or dimming level, of every positive half cycle and measure the current level outputted from the dimmer 100 using the current sensor 205. Although the present embodiments are described and illustrated by increasing the phase angle of every positive half cycle to determine the connected load type, the present embodiments may be implemented by incrementally increasing dimming levels in any of the polarities. For example, the embodiments may be instead implemented by slowly increasing the phase angle, or dimming level, of every negative half cycle without departing from the scope of the present embodiments.

Reference now is made to FIGS. 4A-4D. FIG. 4A shows an AC voltage waveform 400 of the AC power hot signal 101 fed to the dimmer 100. FIG. 4B illustrates an asymmetric forward phase voltage waveform 410 of the dimmed hot output signal 102 used to drive the connected load 103 in order to identify the load type. In the positive half cycle of first cycle $T_1$, the MCU 201 may produce a transistor drive signal 210 to the dimming transistors 204 to drive the load 103 at a very low initial phase angle or dimming level 411. For example, referring to FIG. 3, during the first positive half cycle $T_1$, the MCU 201 may output a transistor drive signal 310A that will turn the dimming transistor 304A off for the majority of the front part of the positive half cycle, and turn it shortly on at a small phase angle at the rear part of the positive half cycle while 304B is on. For example, the MCU 201 may initially drive the load 103 at a 1% dimming level at the initial positive half cycle, although another initial dimming level can be used.

Then in the negative half cycle of first cycle $T_1$, the MCU 201 may drive the load at a low initial dimming level 412. For example, referring to FIG. 3, during the negative half cycle of $T_1$, the MCU 201 may output a transistor drive signal 310B that will turn the dimming transistor 304B off for the majority of the front part of the negative half cycle $T_1$, and turn it shortly on at a small phase angle at the rear part of the negative half cycle $T_1$ while 304A is on. According to one embodiment, dimming level 412 at the negative half cycle $T_1$ may be equal to the initial dimming level 411 in the positive half cycle, for example at 1% dimming level. Although dimming level 412 at the negative half cycle $T_1$ may comprise another value.

According to another embodiment, the MCU 201 may not turn on the dimming transistor 304B in the negative half cycles at all, but keep the voltage at substantially zero. Although, turning the dimmer 100 during the negative half cycles at a small dimming level 412 allows the MCU 201 to measure and take into account the current inrush to the load—i.e., the instantaneous input current drawn by the load 103 when it is first turned on. For example, when certain bulbs turn on, initially the current may spike up high, but then start to come down as the bulb warms up. Turning the load at the negative half cycle allows the MCU 201 to gauge the level of inrush to the load if it is present.

In the next positive half cycle of the second cycle $T_2$, the MCU 201 increments the phase angle, or dimming level, by a predetermined increment value, such as by another 1% or by another increment value (e.g., 2%, 5%, etc.), thereby incrementally increasing the dimming level of the load 103. Then, in subsequent half cycles ($T_3$ to $T_n$), the MCU 201 may maintain a substantially constant dimming level 412 in the negative half cycles, but incrementally increase the dimming level in the positive half cycles by the predetermined increment value until reaching a dimming level threshold ($D_{TH}$). It should be noted that the rise time shown in FIG. 4B is accelerated for illustrative purposes only. According to an embodiment, the real rise time in the dimming level in the positive half cycles may be increased slowly at small increments until reaching the dimming level threshold ($D_{th}$) to avoid false detections due to inrush on certain load types. For example, the MCU 201 may incrementally increase the dimming level in the positive half cycles by 1% until reaching a dimming level threshold ($D_{th}$) of about 50%. This results in an asymmetric forward phase voltage waveform 410 with asymmetric polarity and incrementally increased positive phase angle, or dimming level.

As the MCU 201 increases the dimming level of the dimmed hot output signal 102, it samples the output signal 211 from current sensor 205 to detect the measured current levels of the dimmed hot output signal 102. FIG. 4C illustrates an exemplary current waveform 420 of the dimmed hot output signal 102 outputted from the dimming transistors 204 and measured by the current sensor 205 when the dimmer 100 is connected to a non-inductive load. When the connected load is "normal" or non-inductive, as the MCU 201 incrementally increases the phase angle, or dimming level, in every positive half cycle, the output current 420 will comprise a substantially ratiometric current. Meaning that as the dimming level is increased in the positive half cycle, the current level 421 in every positive half cycle will increase by a similar amount as the voltage is increased—the current increase is substantially proportional to the voltage increase. Similarly, the current level 422 in the negative half cycle will generally stay constant because the dimming level 412 in the negative half cycle remained constant. Current level 422 may decrease with electronic load types with rectified inputs going to bulk DC capacitors due to hold up from the previous positive half cycle.

FIG. 4D illustrates an exemplary current waveform 430 of the dimmed hot output signal 102 outputted from the dimming transistors 204 and measured by the current sensor 205 when the dimmer 100 is connected to an inductive load. When the connected load is an inductive load, as the MCU 201 incrementally increases the phase angle, or dimming level, in every positive half cycle, the output current 430 across the inductive load will not be ratiometric to the output voltage. The output current 430 across the inductive load will instead increase disproportionately in the direction that the current was biased in (i.e., in the positive direction) as the load saturates and allows through significantly more current in that direction than a non-inductive load. An inductive load, such as a magnetic low-voltage transformer, comprises copper wire wound around an iron core. Initially the core is not magnetized in any given direction or it could be magnetized in the direction of the last half cycle it was driven in. When the transformer is initially driven in the positive direction, its core will magnetize towards the positive direction. Then the transformer driven in the negative direction at a very small angle, which will bring its current down towards the negative direction in the initial half cycle. The next time the transformer is driven in the positive direction, since the core is already magnetized in that direction, the transformer will have less inductance, causing the current to increasingly creep up. Additionally, in the subsequent half cycles, the negative spike will disappear entirely because the core will be so magnetized in the positive direction that it will block current flow in the negative direction. While most inductive loads will saturate, some inductive loads require input voltage at a higher phase to saturate. For some loads, the current may not go very high until the driving voltage across the load gets to a higher phase angle. As such, the current could be sampled by the MCU 201 until reaching a dimming level threshold ($D_{th}$), for example, of about 50% dimming level, to detect whether the load has saturated.

While sampling the current level of the output signal 211 to detect saturation, the MCU 201 may detect additional events to determine the type of connected loads. Referring to FIG. 5A, there is shown one positive half cycle 510 of the forward phase voltage waveform of the dimmed hot output signal 102 used to drive the connected load 103 in order to identify the load type. FIG. 5B illustrates an exemplary positive half cycle 520 of a current waveform of the dimmed hot output signal 102 measured by the current sensor 205 illustrating an inrushing current event that may occur when the dimmer 100 is connected to a capacitive load, which is also a non-inductive load. A capacitive load may comprise, for example, a device with a switching power supply such as an LED ballast. For capacitive loads it may be possible to detect a large current inrush 521 during the expected rising edge 512 of the voltage after turn on time 514. Rising edge 512 defines the transition of the voltage from low voltage at time 514, when the dimmer 100 turns on the load, to high voltage at peak 515, when the load is fully turned on at a predetermined voltage level. Typically, the turn on time during the rising edge 512 is a relatively quick occurrence that will last in the order of 30 microseconds. During this rising edge 512, if the detected current 526 is significantly higher than the current detected during the remainder of that half cycle 527, then the load can be classified as capacitive and/or non-inductive. This inrushing current event may occur sooner than the MCU 201 can determine whether the connected load is saturating. As such, detecting this event can potentially speed up auto-load detection and allow for the classification of the load as capacitive. Once a capacitive and/or non-inductive load is identified, the dimmer can switch to reverse phase dimming mode.

In addition, knowing that the connected load is a capacitive load will allow the dimmer to more effectively and efficiently control the capacitive load. Using the load type information the MCU 201 may select and/or set dimming parameters that better correspond to the type of load being dimmed. For example, capacitive loads will often require a lower or higher phase angle at 1% dim levels and require a non-linear dimming curve, which could be implemented by the MCU 201 upon the detection of a capacitive load. According to an additional embodiment, once in reverse phase dim mode, the dimmer can slowly dim up from 1% to 100% to determine at what low level the load starts drawing a consistent amount of current and at what high level the load current draw stops increasing or slows its rate of increase. With this information the dimmer can set the device low end dimming level, high end dimming level, and dimming curve.

Referring to FIG. 5C, there is shown an exemplary positive half cycle 530 of a current waveform of the dimmed hot output signal 102 measured by the current sensor illustrating a double peaked current event that may occur when the dimmer is connected to an inductive load. Also referring to FIG. 4D, before the load becomes fully saturated, for example at around cycle $T_6$, the current in the positive half cycle (i.e., the polarity half cycle driven with asymmetric current) may form a double peaked shape or pattern, for example in exemplary cycles $T_2$, $T_3$, $T_4$, and $T_5$. This event typically would not occur when asymmetrically driving a non-inductive load. Thus, before detecting saturation, the MCU 201 may examine the shape of the positive half cycles in order to detect the shape corresponding to an inductive load, such as the double peaked shape shown in FIG. 5C. According to an embodiment, the MCU 201 may substantially continuously sample the current of the positive half cycle to find two peaks in the current signal. For example, the MCU 201 may find a first peak 532 and a second peak 534. According to one embodiment, upon finding the two peaks 532 and 534, the MCU 201 may classify the load as inductive and drive it in a forward phase dimming mode. According to another embodiment, upon finding the first peak 532 and the second peak 534, the MCU 201 may compare the two peaks 532 and 534 and determine whether the later occurring or second peak 534 is larger than the earlier occurring or first peak 532. If the second peak 534 is larger than the first peak 532, then the MCU 201 may classify the connected load as inductive and drive it in a forward phase dimming mode.

In addition, FIG. 5D shows an exemplary positive half cycle 540 of a current waveform of the dimmed hot output signal 102 measured by the current sensor illustrating a lagging current event that may occur when the dimmer 100 is connected to an inductive load. In addition to the above events, an inductive load current will lag the voltage applied to it. This means that for an inductive load, after the voltage 510 reaches the zero crossing 516, current 542 can still be observed flowing into the load. The MCU 201 may sample the current level of the output signal 211 from current sensor 205 at a set time 544 after the voltage zero crossing 516 to determine whether the amount of observed current is beyond a current level threshold 545. For example in FIG. 5D, since the observed current 546 at a predetermined time 544 after the voltage zero crossing 516 is above the current level threshold 545, then the load could be considered inductive. This lagging current event may occur sooner than the MCU 201 can determine whether the connected load is saturating. As such, detecting this event can potentially accelerate the auto load detection process.

According to another embodiment, some of the above events, including the current inrush on rising edge event and the lagging current event, can be identified without driving the load asymmetrically via an asymmetric forward phase voltage waveform 410. The load may be instead driven with a symmetrical forward phase voltage waveform to detect these events. That being said, for smaller loads, saturating the load may make it easier to detect the lagging current.

Referring to FIG. 6, there is shown a flowchart 600 illustrating the steps of a method for automatically detecting the load type connected to the dimmer according to an illustrative embodiment. In step 602, the auto load detection sequence is initiated, as further discussed below. In step 604, the MCU 201 drives the dimming transistors with an asymmetric forward phase transistor drive signal shown in FIG. 4B. In step 606, the MCU 201 observes current levels of the dimmed hot output signal 102 provided to the load and detected by the current sensor. In step 608, the MCU 201 may identify a load type by determining whether the detected current levels satisfy at least one load type current parameter. In other words, the MCU 201 may store various load type current parameters that allow it to detect the various events discussed above, such as rules, current threshold levels, current sampling times, or the like. Once a load type is identified, the MCU 201 may set to operate in a dimming mode that corresponds to the identified load type in step 610.

For example, returning to FIGS. 4A-4D, the MCU 201 may dim up the load until reaching a dimming level threshold ($D_{th}$) in the positive (or negative) direction, and sample the current level of the output signal 211 from current sensor 205 to detect whether the current has saturated—i.e., identify whether the current rise across the load is ratiometric to the output voltage. Upon detecting that the current has saturated before reaching the dimming level threshold ($D_{th}$), the MCU 201 will determine that the connected load is inductive, turn the load 103 off, and set the dimming mode to forward phase. Also if during this time, if current inrush is observed on the rising edge of the voltage waveform (as in FIG. 5B), dimming will stop and the dimming mode will be set to reverse phase. Alternatively, if during this time a double peaked current is observed in the positive half cycle (as in FIG. 5C), dimming will stop and the dimming mode will be set to forward phase. In addition, if during this time current is observed to lag the voltage (as in FIG. 5D), dimming will stop and the dimming mode will be set to forward phase. However, if the MCU 201 dimmed up the load in the positive direction all the way up to dimming level threshold ($D_{th}$) without observing any of the above mentioned events, the MCU 201 will determine that a non-inductive load is connected to the dimmer 100 and will set to operate in reverse dimming mode.

Beneficially, unlike dimmers that use overvoltage detection techniques to determine the connected load types, the detection method of the present embodiments does not cause the dimmer 100 to overvoltage and potentially get damaged. While the inductive load will get saturated by the dimmer 100, the MCU 201 will slowly cause the saturation at the lowest possible phase angle allowing the MCU 201 to detect it quickly before the current can get high enough to damage the dimmer 100 or the load.

Turning to FIGS. 7A-7D, there is shown a flowchart 700 illustrating the steps for the method of automatically detecting the load type connected to the dimmer 100 in greater detail, in accordance with an illustrative embodiment. Starting with FIG. 7A, the auto load detection mode or sequence may be initiated in response to one of plurality of events. For example, in step 702, the dimmer 100 is powered up. The MCU 201 may detect the connected load type upon each power up or power cycle of the dimmer 100, i.e., after power is initially applied to the dimmer during installation or every time after power is removed from the dimmer 100, for example, due to power outage, circuit breaker trip or turn off, disconnecting an airgap switch of the dimmer, or the like. For example, power may be removed from the dimmer 100 to change the connected load 103. Alternatively, in step 705 the dimmer may be reset or in step 706 the MCU 201 may receive a command to start the automatic load detection sequence. For example, a user may depress one or more buttons on the dimmer or an external control point to reset the dimmer or initiate the automatic load detection sequence as part of the installation process or when a load is changed. In step 707, in response to events 702, 705, 706, or other events, the MCU 201 starts the auto load detection mode, or sequence.

In step 708, the dimmer 100 is set to operate in a forward phase dimming mode during the auto load detection sequence. In step 709, the MCU 201 sets the dimming level (which may also be referred to as the phase angle) of the positive half cycle of the first cycle $T_1$ of the transistor drive signal to a first dimming level ($D_1$). Particularly, the MCU 201 may set the dimming level (or $D_A$) of the first dimming transistor 304A that generates the positive half cycle to the first dimming level ($D_1$). The first dimming level ($D_1$) may, for example, comprise 1%. The MCU 201 may set the dimming level of the negative half cycle of the first cycle $T_1$ of the transistor drive signal to a second dimming level ($D_2$). Particularly, the MCU may set the dimming level (or $D_B$) of the second dimming transistor 304B that generates the negative half cycle to the second dimming level ($D_2$). According to one embodiment, the second dimming level ($D_2$) for transistor 304B may be equal to the first dimming level ($D_1$) of transistor 304A. For example, both first and second dimming levels can be set to 1%. According to another embodiment, the second dimming level ($D_2$) may be larger or smaller than the first dimming level ($D_1$). Yet according to another embodiment, the second dimming level ($D_2$) of the negative cycle dimming transistor 304B may be set to zero—i.e., the dimming transistor 304B will not be turned on during the negative half cycles during the automatic load detection sequence.

Figure 7A:
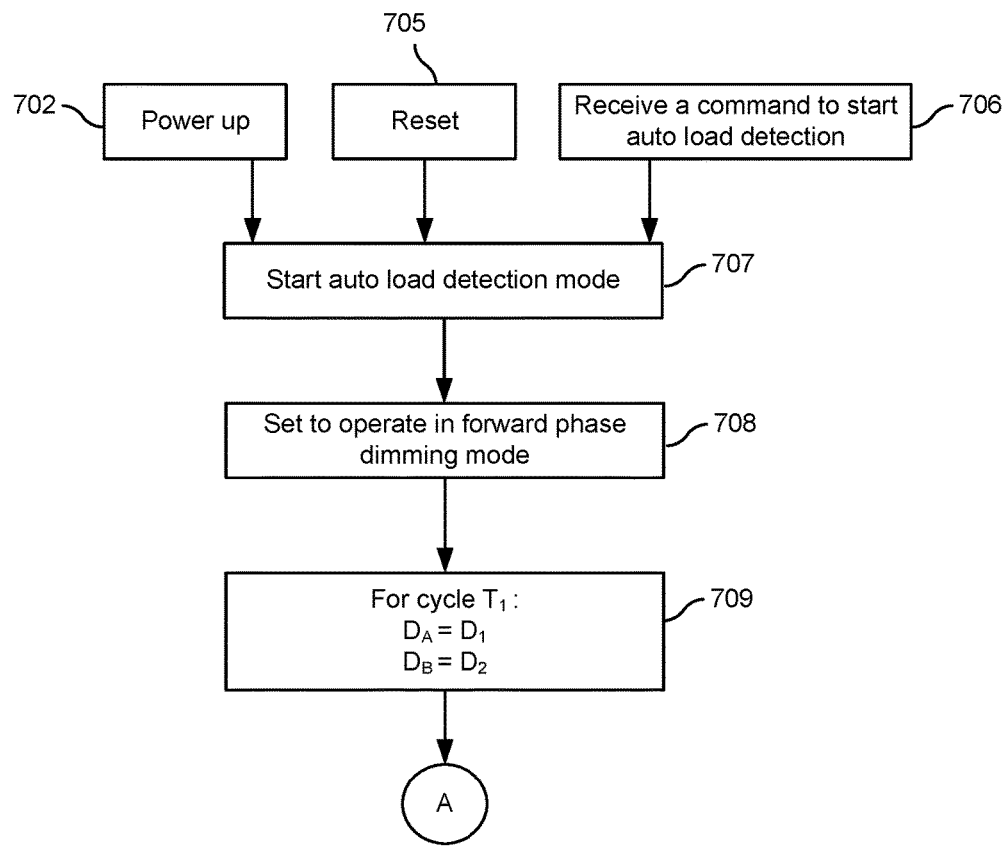
Figure 7B:
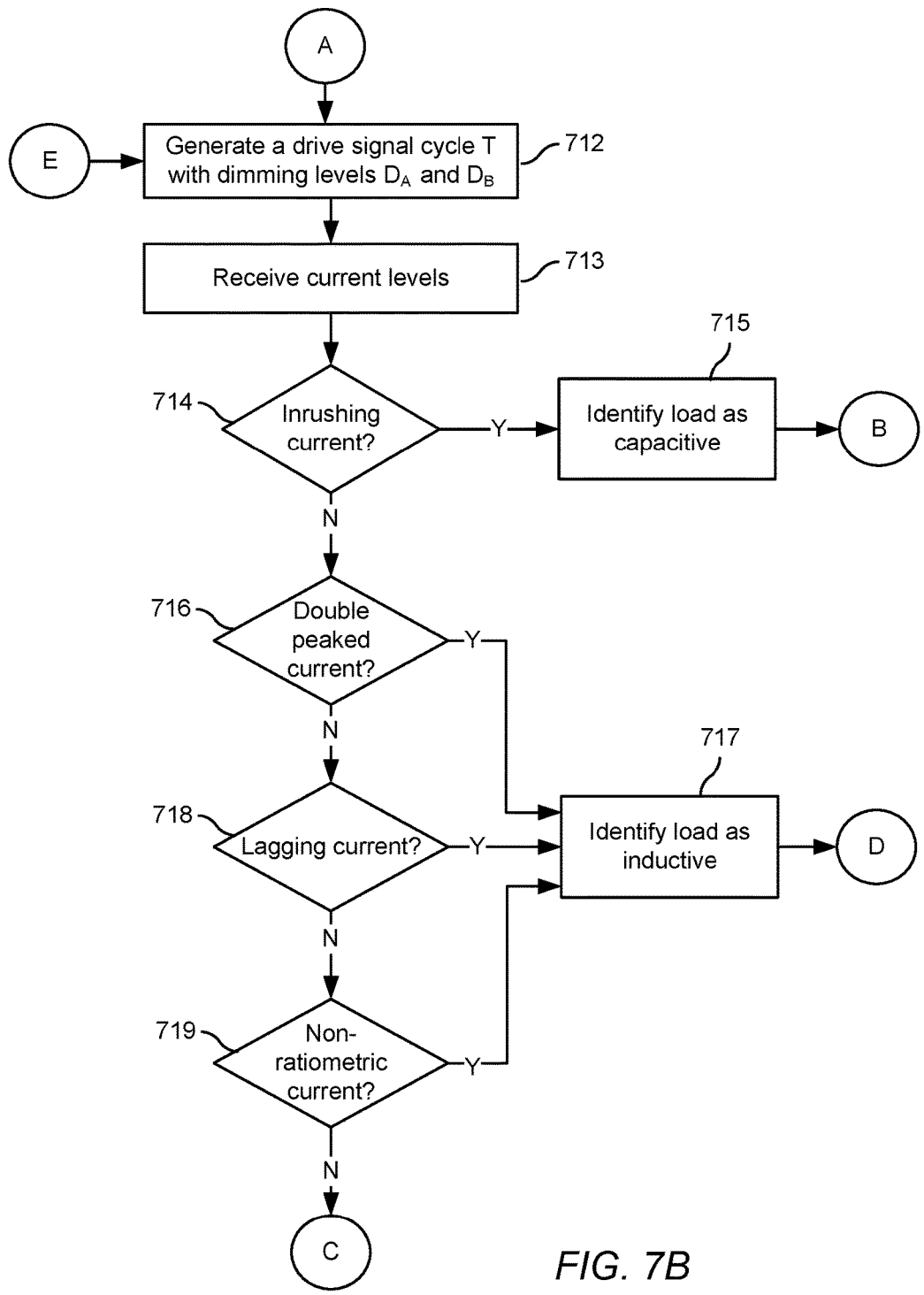

Referring to FIG. 7B, in step 712, the MCU 201 generates a forward phase transistor drive signal to drive the dimming transistors 304A and 305B in forward phase with a drive signal cycle T having dimming levels $D_A$ and $D_B$. For the first cycle $T_1$, the dimming levels are set to the first dimming level ($D_1$) and second dimming level ($D_2$) as discussed above. For example, referring to FIG. 4B, the load control circuit 200 may generate the forward phase dimmed hot output signal 410 at first cycle $T_1$ at 1% dimming positive level 411 and 1% negative dimming level 412.

In step 713, the MCU 201 may observe current levels into the load 103 by receiving current levels from the current sensor 205. For example, the MCU 201 may substantially continuously sample the current sensor output signal 211 from the current sensor 205, or at particular times, such as each time after turning the positive half cycle transistor 304A or the negative half cycle transistor 304B on and/or off.

In step 714, the MCU 201 checks if current inrush was observed on the rising edge of the dimmed output voltage waveform in relation to the rest of the current in that half cycle. For example, referring to FIG. 5B, the MCU 201 may sample the current from the current sensor during the rising edge 512 of the voltage 510 after the turn on time 514 and identify a first current peak 526. The MCU 201 may then sample the current during the rest 525 of the current half cycle (i.e., after the rising edge 512), and identify a steady state current peak 527. The MCU 201 may then compare the first current peak 526 during the rising edge 512 to the second steady state current peak 527 in the remainder of the half cycle after the rising edge 512. If the first current peak 526 is larger than the steady state current peak 527 by a value that equals or exceeds a predetermine threshold value, then the MCU 201 may detect the current inrush event.

Figure 7C:
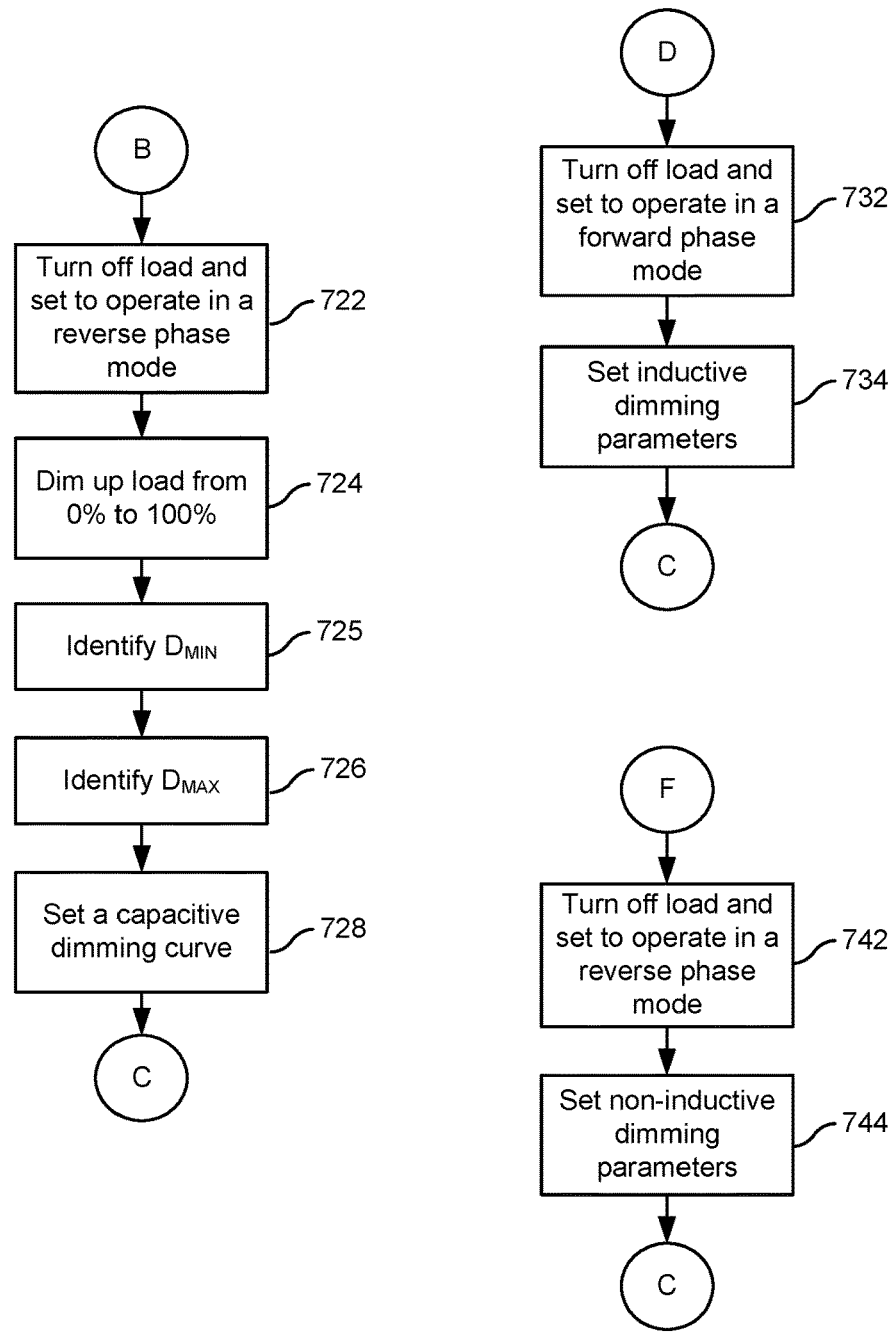

If at any time the MCU 201 determines in step 714 that the detected current, during the rising edge, exceeds the current in the rest of the half cycle by at least the predetermined threshold value, then in step 715 the MCU 201 identifies the load as a capacitive load, or a non-inductive load, and continues to step 722 in FIG. 7C. In step 722 the MCU 210 will turn off the load and set to operate in a reverse phase mode during normal operation. Accordingly, as soon as the MCU 201 detects that a capacitive load is connected it will turn the load off.

According to an embodiment, the MCU 201 may comprise a counter that counts the number of times the MCU 201 detects a current inrush during the rising edge of the dimmed voltage waveform. Before switching to the reverse phase mode in step 722, the MCU 201 may continue to increment the dimming level until detecting a current inrush during the rising edge of the dimmed voltage waveform for a predetermined number of positive half cycles, for example, for two or three consecutive or non-consecutive positive half cycles.

According to further embodiments, upon detecting a capacitive load, the MCU 201 may further set other dimming parameters that correspond to the identified capacitive (or non-inductive) load. For example, in step 724, the MCU 201 may dim up the load from 0% to 100% to identify a device low end dimming level (or $D_{MIN}$) in step 725 and a high end dimming level (or $D_{MAX}$) in step 726. Using these values, the MCU 201 may set a capacitive dimming curve in step 728.

Figure 7D:
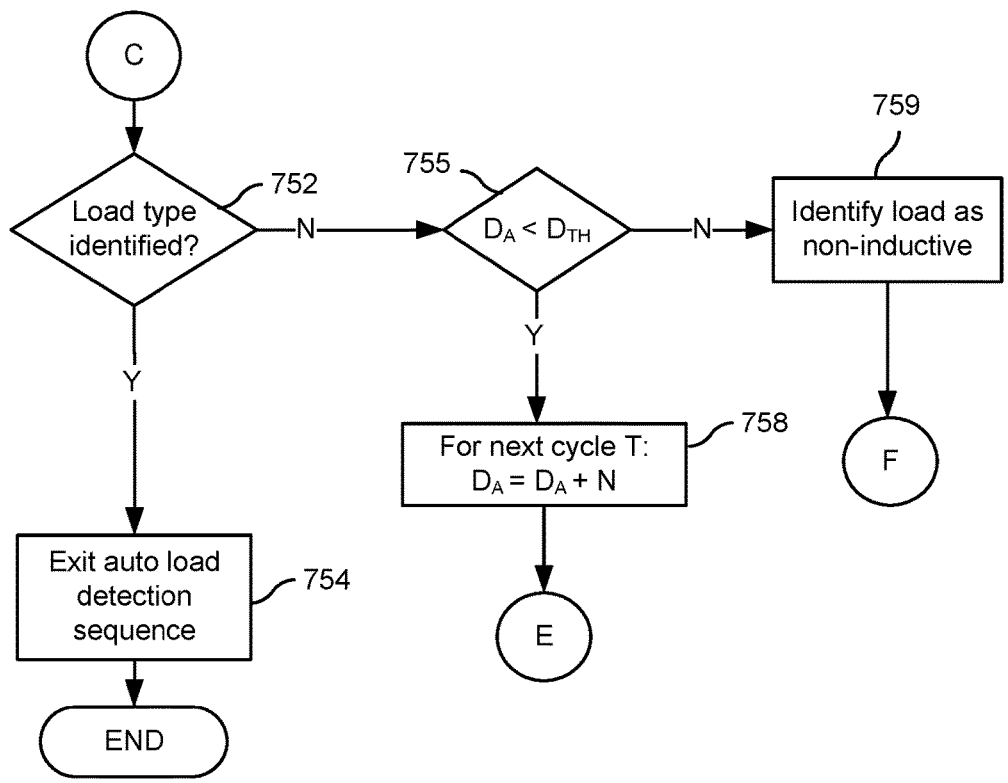

The MCU 201 may then move to step 752 in FIG. 7D. Since the MCU 201 identified a load type and set dimming parameters, the MCU 201 may exit the auto load detection sequence in step 754 and proceed to normal operation.

Returning to FIG. 7B, if no inrush is observed in step 714, the MCU 201 will proceed to step 716. In step 716, the MCU 201 checks if double peaked current is found on the positive (or negative) half cycle. Referring to FIG. 5C, the MCU 201 may substantially continuously sample the current during the positive half cycle to identify two current peaks. For example, the MCU 201 may continuously compare the current levels to each other and identify a first current peak 532 by finding the highest current level before current begins to drop. If after the drop the current begins to rise again, the MCU 201 may identify a second current peak 532 by finding the highest current level before the current beings to drop again. In accordance to one embodiment, the MCU 201 may detect the double peaked event by determining that there is at least one current level drop 535 between the first current level peak 532 and the second current level peak 534 that is smaller than both the first current level peak 532 and the second current level peak 534. According to a further embodiment, the MCU 201 may compare the first detected current peak 532 to the second detected current peak 534. If the second current peak 534 is larger than the first current peak 532, then the MCU 201 may detect the double peaked current event. In accordance with another embodiment, the MCU 201 may identify the double peaked current event by determining whether the second current peak 534 is larger than the first current peak 532 by a value that equals or exceeds a predetermine threshold value.

If at any time the MCU 201 detects in step 716 the double peaked current event, then in step 717 the MCU 201 identifies the load as an inductive load and continues to step 732 in FIG. 7C. In step 732 the MCU 210 will turn off the load and set to operate in a forward phase mode during normal operation. Accordingly, as soon as the MCU 201 detects that an inductive load is connected it will turn the load off, without subjecting the dimmer 100 to overvoltage spikes.

According to an embodiment, the MCU 201 may comprise a counter that counts the number of times the MCU 201 detects a double peaked current event. Before switching to the forward phase mode in step 732, the MCU 201 may continue to increment the dimming level until detecting the double peaked current event in a predetermined number of positive half cycles, for example, for two or three consecutive or non-consecutive positive half cycles.

According to a further embodiment, upon detecting an inductive load, the MCU 201 may set other dimming parameters in step 734 that correspond to the identified inductive load, such as dimming curves or the like. The MCU 201 may then move to step 752 in FIG. 7D. Since the MCU 201 identified a load type and set dimming parameters, the MCU 201 may exit the auto load detection sequence in step 754 and proceed to normal operation.

Returning to FIG. 7B, if no double peaked current is observed in step 716, the MCU 201 will proceed to step 718. In step 718, the MCU 201 determines whether the detected current is lagging beyond the voltage zero cross to identify the lagging current event. Referring to FIG. 5D, the MCU 201 may sample the current level of the output signal 211 from current sensor 205 at a set time 544 after the voltage zero crossing 516 to determine whether the amount of observed current is beyond a current level threshold 545. For example in FIG. 5D, since the observed current 546 at a predetermined time 544 after the voltage zero crossing 516 is above the current level threshold 545, the MCU 201 will detect the lagging current event.

If at any time the MCU 201 detects in step 718 the lagging current event, then in step 717 the MCU 201 will determine that an inductive load is connected to the dimmer 100. As discussed above with reference to FIG. 7C, the MCU will then turn off the load 103 and set to operate in a forward phase mode during normal operation in step 732 and may set any applicable inductive dimming parameters in step 734. Accordingly, as soon as the MCU 201 detects that an inductive load is connected it will turn the load off, without subjecting the dimmer 300 to overvoltage spikes.

According to an embodiment, the MCU 201 may comprise a counter that counts the number of times the MCU 201 detects the current is lagging beyond the voltage zero cross. Before switching to the forward phase mode in step 732, the MCU 201 may continue to increment the dimming level until detecting the current extending beyond the voltage zero cross for a predetermined number of positive half cycles, for example, for two or three consecutive or non-consecutive positive half cycles.

The MCU 201 may then move to step 752 in FIG. 7D. Since the MCU 201 identified a load type and set dimming parameters, the MCU 201 may exit the auto load detection sequence in step 754 and proceed to normal operation.

Returning to FIG. 7B, if no lagging current event is observed in step 718, the MCU 201 will proceed to step 719. In step 719, the MCU 201 will determine whether the observed current rise is ratiometric to the expected voltage output rise of the dimmed hot output signal 102 of the half cycle when the positive dimming transistor 304A is on (taking into account any inrush observed on the negative half cycle). According to an embodiment, the MCU 201 may compute a ratio between the detected current to the expected voltage of a given positive half cycle, and compare that ratio to a preceding ratio between a detected current to the expected voltage of a preceding positive half cycle. In another embodiment, the MCU 201 may compute the percentage of expected voltage rise between two consecutive positive half cycles and compare that to the percentage of detected current rise between two consecutive positive half cycles. In yet another embodiment, the MCU 201 may first drive the connected load symmetrically to observe the current levels. The MCU 201 may then compare the current levels detected when the load was driven asymmetrically to the current levels when the load was driven symmetrically and look for significant difference in the current levels.

If at any time the MCU 201 determines in step 719 that the detected current rise is not ratiometric to the expected voltage output rise when the positive dimming transistor 304A is on (taking into account any inrush observed on the negative half cycle), then the MCU 201 continues to step 717. In step 717, the MCU 201 will determine that an inductive load is connected to the dimmer 100; in step 732, the MCU 201 will turn off the load 103 and set to operate in a forward phase mode during normal operation; and in step 734 the MCU 201 may set any applicable inductive dimming parameters. Accordingly, as soon as saturation is detected by the MCU 201, the MCU 201 will detect that an inductive load is connected and turn the load off, without subjecting the dimmer 300 to overvoltage spikes.

According to an embodiment, the MCU 201 may comprise a counter that counts the number of times the MCU 201 detects non-ratiometric current rise. Before switching to the forward phase mode in step 732, the MCU 201 may continue to increment the dimming level until detecting non-ratiometric current rise for a predetermined number of positive half cycles, for example, for two or three consecutive or non-consecutive positive half cycles.

The MCU 201 may then move to step 752 in FIG. 7D. Since the MCU 201 identified a load type and set dimming parameters, the MCU 201 may exit the auto load detection sequence in step 754 and proceed to normal operation.

Returning to FIG. 7B, if the MCU 201 does not determine any non-ratiometric current rise, the MCU 201 will proceed to step 752 in FIG. 7D. In step 752, the MCU 201 will then determine that it did not detect any current events and thereby it did not identify the load type during the given positive (or negative) half cycle and move to step 755. In step 755, the MCU 201 determines whether the dimming level ($D_A$) of the positive dimming transistor 304A has reached the dimming level threshold ($D_{TH}$). For example, the dimming level threshold ($D_{TH}$) may comprise 50%. If the dimming level ($D_A$) of the positive dimming transistor 304A is less than the dimming level threshold ($D_{TH}$), then the MCU 201 goes to step 758.

In step 758, the MCU 201 increments the dimming level of the subsequent positive half cycle of the transistor drive signal by a predetermined increment value (N), for example by 1%. Particularly, the MCU 201 may increment the dimming level (or $D_A$) of the first dimming transistor 304A that generates the positive half cycle by the predetermined increment value (N). The dimming level of the subsequent negative half cycles (or the dimming level (or $D_B$) of the negative dimming transistor 304B) may stay substantially the same at the second dimming level ($D_2$). The MCU 201 will then proceed to step 712 in FIG. 7B and generate the next drive signal cycle $T_x$ to drive the dimming transistors 304A and 305B in forward phase with an incremented dimming level $D_A$ and substantially continuous dimming level $D_B$. For example, referring to FIG. 4B, the load control circuit 200 may generate the forward phase dimmed hot output signal 410 at cycle $T_2$ at 2% positive dimming level and 1% negative dimming level. According to an alternative embodiment, as discussed above, in step 758 the MCU 201 may instead increment the dimming level (or $D_B$) of the second dimming transistor 304B that generates the negative half cycle by the predetermined increment value (N), while keeping the dimming level (or $D_A$) of the first dimming transistor 304B that generates the positive half cycle substantially continuous.

Then, in steps 713 the MCU 201 will observe the current levels in the next positive half cycle to detect various current events in steps 714, 716, 718, and 719. It should be understood that the MCU 201 may detect the various current events in steps 714, 716, 718, and 719 in any different order or simultaneously. In this manner, the MCU 201 will continue to increment the dimming level ($D_A$) of the positive dimming transistor 304A by the predetermined increment value (N) and observe the current levels until either (i) detecting the inrushing current event, the double peaked current event, the lagging current event, or that the current rise is not ratiometric to the expected voltage output rise, or (ii) until the dimming level ($D_A$) of the positive dimming transistor 304A reaches the dimming level threshold ($D_{TH}$).

Referring to FIG. 7D, if the MCU 201 determines in step 755 that the dimming level ($D_A$) of the positive dimming transistor 304A is equal to or above the dimming level threshold ($D_{TH}$) without detecting any saturation in the current rise (i.e., without detecting that the current rise is not ratiometric to the expected voltage output rise), or detecting any of the aforementioned current events, the MCU 201 will move to step 759.

In step 759, the MCU 201 will identify the load connected to the dimmer 100 as a non-inductive load and continues to step 742 in FIG. 7C. In step 742 the MCU 210 will turn off the load and set to operate in a reverse phase mode during normal operation. Effectively, upon not detecting any of the above current events, the MCU 201 sets to operate in a default dimming mode, which can be the reverse phase mode. In step 744, the MCU 201 may set other dimming parameters that correspond to the identified non-inductive load, such as dimming curves or the like. The MCU 201 may then move to step 752 in FIG. 7D. Since the MCU 201 identified a load type and set dimming parameters, the MCU 201 may exit the auto load detection sequence in step 754 and proceed to normal operation.

INDUSTRIAL APPLICABILITY

To solve the aforementioned problems, the aspects of the embodiments are directed towards a system, software, and a method for automatically detecting the load type connected to a dimmer. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A dimmer circuit for detecting a connected load type comprising:
    a plurality of dimming transistors adapted to provide a dimmed hot output signal to a load;
    a current sensor adapted to sense current levels of the dimmed hot output signal; and
    a controller adapted to:
        store at least one load type current parameter associated with a dimming mode;
        generate an asymmetric forward phase transistor drive signal with half cycles of one polarity having incrementally increasing dimming levels to drive the plurality of dimming transistors;
        receive current levels from the current sensor;
        determine whether at least one of the received current levels satisfies at least one stored current parameter;
        when at least one current level satisfies at least one current parameter, set to operate in a dimming mode associated with the satisfied current parameter; and
        when the received current levels do not satisfy the stored at least one load type current parameter, set to operate in a default dimming mode.

2. The dimmer circuit of claim 1, wherein the transistor drive signal comprises half cycles of opposite polarity to the one polarity having a substantially constant dimming level.

3. The dimmer circuit of claim 1, wherein the transistor drive signal comprises half cycles of opposite polarity to the one polarity having a substantially zero dimming level.

4. The dimmer circuit of claim 1, wherein the half cycles of one polarity comprise one of positive half cycles or negative half cycles.

5. The dimmer circuit of claim 1, wherein the default dimming mode comprises a reverse phase dimming mode.

6. The dimmer circuit of claim 1, wherein the controller incrementally increases the dimming levels of the half cycles of one polarity until: (i) at least one of the received current levels satisfies the at least one current parameter, or (ii) reaching a dimming level threshold.

7. The dimmer circuit of claim 1, wherein the controller is further adapted to:
    set a dimming level of a first half cycle of the one polarity of the transistor drive signal to a first dimming level; and
    incrementally increase a dimming level of each subsequent half cycle of the one polarity by a predetermined increment value.

8. The dimmer circuit of claim 1, wherein the current sensor is further adapted to detect an overcurrent event when a sensed current level is above an overcurrent fault threshold.

9. The dimmer circuit of claim 1, further comprising an overvoltage protection device adapted to being triggered during an overvoltage event.

10. The dimmer circuit of claim 1, wherein the controller comprises a counter that counts the number of times the received current levels satisfy the at least one current parameter before setting to operate in the dimming mode associated with the satisfied current parameter.

11. The dimmer circuit of claim 1, wherein the controller is further adapted to set at least one dimming parameter associated with the satisfied current parameter.

12. The dimmer circuit of claim 11, wherein the at least one dimming parameter comprises at least one of a dimming curve, a minimum dimming level, a maximum dimming level, and any combinations thereof.

13. The dimmer circuit of claim 1, wherein the at least one load type current parameter comprises at least one of a rule, a predetermined threshold, a current level sampling time, and any combinations thereof.

14. The dimmer circuit of claim 1, wherein the at least one current parameter defines an inrushing current event, wherein controller is further adapted to:
determine whether at least one of the received current levels satisfies the at least one parameter of the inrushing current event; and
set to operate in a reverse phase dimming mode upon detecting the inrushing current event.

15. The dimmer circuit of claim 14, wherein the controller detects the inrushing current event by:
identifying a first current level peak during an expected voltage rising edge of a half cycle of the dimmed hot output signal;
identifying a steady state current level peak after the expected voltage rising edge; and
detecting the inrushing current event when the first current level peak is larger than the steady state current level peak by a predetermined threshold.

16. The dimmer circuit of claim 14, wherein the controller is further adapted to:
identify the connected load as a capacitive load upon detecting the inrushing current event.

17. The dimmer circuit of claim 16, wherein the controller is further adapted to determine a dimming curve for the identified capacitive load.

18. The dimmer circuit of claim 17, wherein the controller determines the dimming curve by dimming up the connected load to determine at what low level the load starts drawing a consistent amount of current and at what high level the load's current draw stops or slows increasing.

19. The dimmer circuit of claim 1, wherein the at least one current parameter defines a current waveform shape of a half cycle that corresponds to a load type.

20. The dimmer circuit of claim 1, wherein the at least one current parameter defines a double peaked current event, wherein the controller is further adapted to:
determine whether at least one of the received current levels satisfies the at least one parameter of the double peaked current event; and
set to operate in a forward phase dimming mode upon detecting the double peaked current event.

21. The dimmer circuit of claim 20, wherein the controller detects the double peaked current event by identifying a first current level peak in a half cycle and a subsequent second current level peak in the half cycle, such that there is at least one current level drop between the first current level peak and the second current level peak that is smaller than both the first current level peak and the second current level peak.

22. The dimmer circuit of claim 20, wherein the controller detects the double peaked current event by:
identifying a first current level peak and a subsequent second current level peak; and
detecting the double peaked current event when the second current level peak is larger than the first current level peak.

23. The dimmer circuit of claim 20, wherein the controller detects the double peaked current event by:
identifying a first current level peak and a subsequent second current level peak; and
detecting the double peaked current event when the second current level peak is larger than the first current level peak by a predetermined threshold.

24. The dimmer circuit of claim 1, wherein the at least one current parameter defines a lagging current event, wherein the controller is further adapted to:
determine whether at least one of the received current levels satisfies the at least one parameter of the lagging current event; and
set to operate in a forward phase dimming mode upon detecting the lagging current event.

25. The dimmer circuit of claim 24, wherein the controller detects the lagging current event by determining whether at least one of the received current levels of a half cycle lags an expected voltage zero cross of the dimmed hot output signal.

26. The dimmer circuit of claim 24, wherein the controller detects the lagging current event by determining whether a sensed current level at a set time after an expected voltage zero cross of the dimmed hot output signal is larger than a current level threshold.

27. The dimmer circuit of claim 1, wherein the at least one current parameter defines a non-ratiometric current event, wherein the controller is further adapted to:
determine whether the received current levels comprise a current rise that is substantially non-ratiometric to an expected voltage rise; and
when determining that the current rise is substantially non-ratiometric, set to operate in a forward phase dimming mode.

28. The dimmer circuit of claim 27, wherein the controller is further adapted to:
when determining that the current rise is substantially ratiometric, set to operate in a reverse phase dimming mode.

29. The dimmer circuit of claim 28, wherein the controller determines that that the current rise is substantially ratiometric when the dimming level of the transistor drive signal reached a dimming level threshold without detecting that the current rise is substantially non-ratiometric.

30. A dimmer circuit for detecting a connected load type comprising:
a plurality of dimming transistors adapted to provide a dimmed hot output signal to a load;
a current sensor adapted to sense current levels of the dimmed hot output signal; and
a controller adapted to:
generate an asymmetric forward phase transistor drive signal comprising positive or negative half cycles of incrementally increasing dimming levels to drive the plurality of dimming transistors;
receive the current levels from the current sensor;
determine whether the received current levels comprise a current rise that is substantially non-ratiometric to an expected voltage rise;
when determining that the current rise is substantially non-ratiometric, set to operate in a forward phase dimming mode.

31. The dimmer circuit of claim 30, wherein the controller is further adapted to:
when determining that the current rise is substantially ratiometric, set to operate in a reverse phase dimming mode.

32. The dimmer circuit of claim 31, wherein the controller determines that that the current rise is substantially ratiometric when the dimming level of the transistor drive signal reached a dimming level threshold without detecting that the current rise is substantially non-ratiometric.

33. A dimmer circuit for detecting a connected load type comprising:

a plurality of dimming transistors adapted to provide a dimmed hot output signal to a load;

a current sensor adapted to sense current levels of the dimmed hot output signal; and a controller adapted to:
  generate a forward phase transistor drive signal to drive the plurality of dimming transistors;
  receive current levels from the current sensor;
  detect an inrushing current event when a first current level peak detected during an expected voltage rising edge of a half cycle of the dimmed hot output signal is larger than a steady state current level peak detected after the expected voltage rising edge; and
  set to operate in a reverse phase dimming mode upon detecting the inrushing current event.

34. The dimmer circuit of claim 33, wherein the transistor drive signal comprises an asymmetric transistor drive signal with positive or negative half cycles of incrementally increasing dimming levels.

35. The dimmer circuit of claim 33, wherein the controller is further adapted to:
  set to operate in a default dimming mode when the inrushing current event is not detected.

36. The dimmer circuit of claim 33, wherein the controller is further adapted to:
  identify the connected load as a capacitive load upon detecting the current inrush event.

37. A dimmer circuit for detecting a connected load type comprising:
  a plurality of dimming transistors adapted to provide a dimmed hot output signal to a load;
  a current sensor adapted to sense current levels of the dimmed hot output signal; and
  a controller adapted to:
    generate an asymmetric forward phase transistor drive signal with half cycles of one polarity having incrementally increasing dimming levels to drive the plurality of dimming transistors;
    receive current levels from the current sensor;
    detect a double peaked current event by identifying a first current level peak in a half cycle and a subsequent second current level peak in the half cycle, such that there is at least one current level drop between the first current level peak and the second current level peak that is smaller than both the first current level peak and the second current level peak; and
    set to operate in a forward phase dimming mode upon detecting the double peaked current event.

38. The dimmer circuit of claim 37, wherein the controller is further adapted to:
  set to operate in a default dimming mode when the double peaked current event is not detected.

39. The dimmer circuit of claim 37, wherein the controller detects the double peaked current when the second current level peak is larger than the first current level peak.

40. The dimmer circuit of claim 37, wherein the controller detects the double peaked current when the second current level peak is larger than the first current level peak by a predetermined threshold.

41. A dimmer circuit for detecting a connected load type comprising:
  a plurality of dimming transistors adapted to provide a dimmed hot output signal to a load;
  a current sensor adapted to sense current levels of the dimmed hot output signal; and
  a controller adapted to:
    generate a forward phase transistor drive signal to drive the plurality of dimming transistors;
    receive current levels from the current sensor;
    detect a lagging current event when at least one of the received current levels of a half cycle lags an expected voltage zero cross of the dimmed hot output signal; and
    set to operate in a forward phase dimming mode upon detecting the lagging current event.

42. The dimmer circuit of claim 41, wherein the transistor drive signal comprises an asymmetric transistor drive signal with positive or negative half cycles of incrementally increasing dimming levels.

43. The dimmer circuit of claim 41, wherein the controller detects the lagging current event when a sensed current level at a set time after an expected voltage zero cross is larger than a current level threshold.

44. The dimmer circuit of claim 41, wherein the controller is adapted to:
  set to operate in a default phase dimming mode upon not detecting the lagging current event.

* * * * *